(12) United States Patent
Yoshida et al.

(10) Patent No.: US 7,910,213 B2
(45) Date of Patent: Mar. 22, 2011

(54) GAS-BARRIER LAMINATE

(75) Inventors: Shigenobu Yoshida, Tokyo (JP); Chiharu Okawara, Tokyo (JP); Tooru Hachisuka, Tokyo (JP)

(73) Assignee: Mitsubishi Plastics, Inc., Tokyo (JP)

( * ) Notice: Subject to any disclaimer, the term of this patent is extended or adjusted under 35 U.S.C. 154(b) by 1056 days.

(21) Appl. No.: 10/599,065

(22) PCT Filed: Mar. 23, 2005

(86) PCT No.: PCT/JP2005/005189
§ 371 (c)(1),
(2), (4) Date: Nov. 29, 2006

(87) PCT Pub. No.: WO2005/092607
PCT Pub. Date: Oct. 6, 2005

(65) Prior Publication Data
US 2007/0224402 A1 Sep. 27, 2007

(30) Foreign Application Priority Data

Mar. 25, 2004 (JP) .................................. 2004-090039
Aug. 31, 2004 (JP) .................................. 2004-253341

(51) Int. Cl.
*B32B 27/40* (2006.01)
(52) U.S. Cl. ........................ 428/423.1; 428/480; 428/458
(58) Field of Classification Search ................... 428/446, 428/447, 448, 480, 457, 458, 473, 475.2, 428/483, 423.1
See application file for complete search history.

(56) References Cited

U.S. PATENT DOCUMENTS

| | | | |
|---|---|---|---|
| 5,856,017 A * | 1/1999 | Matsuda et al. | ............... 428/446 |
| 6,194,061 B1 * | 2/2001 | Satoh et al. | ................... 428/341 |
| 6,866,949 B2 * | 3/2005 | Ota et al. | ....................... 428/702 |
| 2002/0009564 A1 * | 1/2002 | Hall et al. | .................... 428/35.7 |

FOREIGN PATENT DOCUMENTS

| JP | 02-299826 | 12/1990 |
|---|---|---|
| JP | 05-009317 | 1/1993 |
| JP | 05-269914 | 10/1993 |
| JP | 05-309777 | 11/1993 |
| JP | 07-137192 | 5/1995 |
| JP | 10-071663 | 3/1998 |
| JP | 2000-233479 | 8/2000 |
| JP | 2000-263683 | 9/2000 |
| JP | 2001-162711 | 6/2001 |
| JP | 2001-270026 | 10/2001 |
| JP | 2002-234102 | 8/2002 |
| JP | 2002-370749 | 12/2002 |

OTHER PUBLICATIONS

International Preliminary Report on Patentability dated Mar. 23, 2005 issued for corresponding International Patent Application No. PCT/JP2005/005189.
International Search Report dated Jul. 12, 2005 issued for corresponding International Patent Application No. PCT/JP2005/005189.

* cited by examiner

*Primary Examiner* — Thao T. Tran
(74) *Attorney, Agent, or Firm* — Oblon, Spivak, McClelland, Maier & Neustadt, L.L.P.

(57) ABSTRACT

A gas-barrier laminate with a plastic substrate, an inorganic thin film formed on at least one surface of the plastic substrate, and a coating layer formed by applying a coating material on a surface of the inorganic thin film, wherein said coating layer contains a polyester-based resin having a molecular weight of 3000 to 15000 and a polyurethane-based resin having a molecular weight of 8000 to 30000 at a weight ratio of 5/95 to 95/5, and said gas-barrier laminate has an oxygen permeability of not more than 25 fmol/m$^2$/s/Pa; and a gas-barrier laminate comprising a plastic substrate, an inorganic thin film formed on at least one surface of the plastic substrate, and a coating layer formed by applying a coating material on a surface of the inorganic thin film, wherein the gas-barrier laminate exhibits an oxygen permeability of not more than 50 fmol/m$^2$/s/Pa as measured with respect to a gas-barrier film obtained by laminating an unstretched polypropylene film having a thickness of 60 μm on the coating layer of the gas-barrier laminate after subjecting the gas-barrier film to hydrothermal treatment at 120° C. for 30 min, and the coating layer has either a hardness of 0.1 to 0.5 GPa as measured at 23° C. in atmospheric air by a nano-indentation hardness testing method, a hardness of 0.03 to 0.5 GPa as measured at 23° C. in water by a nano-indentation hardness testing method, or a ratio of number of carbon atoms derived from carboxyl groups to number of carbon atoms constituting the surface of the coating layer of 0.005 to 0.1.

21 Claims, No Drawings

GAS-BARRIER LAMINATE

CROSS-REFERENCE TO PRIOR APPLICATIONS

This is a U.S. national phase application under 35 U.S.C. §371 of International Patent Application No. PCT/JP2005/005189 filed Mar. 23, 2005, and claims the benefit of Japanese Application No. 2004-090039, filed Mar. 25, 2004, and Japanese Application No. 2004-253341, filed Aug. 31, 2004. The International Application was published in Japanese on Oct. 6, 2005 as International Publication No. WO 2005/092607 A1 under PCT Article 21(2).

TECHNICAL FIELD

The present invention relates to a gas-barrier laminate, and more particularly to a gas-barrier laminate which is excellent in gas-barrier property, adhesion property of a gas-barrier layer and printability (in particular, gradation-printability) and free from deterioration in gas barrier property even when printed thereon, and can exhibit an excellent adhesion between a plastic substrate and an inorganic thin film formed thereon and can maintain an excellent gas-barrier property even when subjecting the laminate to hydrothermal treatment.

BACKGROUND ARTS

Hitherto, gas-barrier laminates including a plastic substrate and an inorganic thin film made of aluminum oxide, magnesium oxide, silicon oxide, etc., and formed on the surface of the plastic substrate by a vapor-deposition method, a sputtering method, a CVD method or an ion-plating method, have been extensively used in various applications such as packaging of products which should be shielded against various gases such as water vapor and oxygen, and packaging of food, industrial products and drugs for preventing deterioration in quality thereof. These gas-barrier laminates have been recently used not only in these packaging applications, but also as a component of transparent conductive sheets which are used in liquid crystal displays, solar cells, electromagnetic shielding members, touch panels, EL substrates or color filters. Moreover, the above gas-barrier laminates have also been widely used as printed packaging materials because such an inorganic thin film generally has a good wettability and, therefore, a good printability.

In order to enhance a gas-barrier property of the inorganic thin film of the above gas-barrier laminates, there have been proposed methods of subjecting the inorganic thin film to various surface treatments. For example, there is known the method of absorbing water in a vapor-deposited silicon oxide film used as the inorganic thin film and then heat-treating the film to enhance a gas-barrier property thereof (e.g., refer to Japanese Patent Application Laid-Open (KOKAI) No. 2-299826).

However, the gas-barrier laminate obtained by the above method has such a problem that when the inorganic thin film is rubbed in subsequent laminating and printing processes, or when the resultant laminate is folded or bent in a subsequent bag-making process, the inorganic thin film tends to be damaged, resulting in deteriorated gas-barrier property. In particular, in the case where white ink containing a titanium oxide pigment is used for printing, the inorganic thin film tends to be more severely damaged and, therefore, considerably deteriorated in gas-barrier property. In particular, if the inorganic thin film is damaged by printing, there tends to arise such a problem that a gas-barrier property of the laminate is considerably deteriorated when subjected to subsequent hydrothermal treatment.

In order to prevent the inorganic thin film from being damaged upon the above various processes, there have been proposed the method of forming a transparent primer layer made of a resin having a glass transition point of not less than 40° C. on the surface of the inorganic thin film (e.g., refer to Japanese Patent Application Laid-Open (KOKAI) No. 5-269914), the method of forming an aqueous anchor coat layer on the surface of the inorganic thin film (e.g., refer to Japanese Patent Application Laid-Open (KOKAI) No. 5-309777), the method of forming a layer made of an aqueous resin or an aqueous emulsion containing silicon oxide on the surface of the inorganic thin film (e.g., refer to Japanese Patent Application Laid-Open (KOKAI) No. 5-9317), the method of forming a primer layer made of a polyester resin, a polyurethane resin or a nitrocellulose resin having a glass transition temperature of 60 to 80° C. and a molecular weight of 10000 to 20000 on the surface of the inorganic thin film (e.g., refer to Japanese Patent Application Laid-Open (KOKAI) No. 7-137192), the method of forming a coating layer made of an organic polymer and inorganic fine particles on the surface of the inorganic thin film (e.g., refer to Japanese Patent Application Laid-Open (KOKAI) No. 10-71663), and the method of forming a coating layer made of a resin such as urethane and/or vinyl chloride-vinyl acetate copolymers on the surface of the inorganic thin film (e.g., refer to Japanese Patent Application Laid-Open (KOKAI) No. 2001-270026).

However, when a printing ink is applied onto the surface of the resin coating layer to form a printed layer thereon, there tend to be various problems such as ink bleeding due to penetration of a solvent contained in the printing ink into the resin coating layer, and cissing of the printing ink due to poor wettability of the resin coating layer. Thus, the conventional laminates which are subjected to printing, in particular, gradation printing, tend to suffer from poor appearance. Further, since an adhesion strength between the plastic substrate and the inorganic thin film is low, the resultant laminates tend to be deteriorated in hand-cutting property.

In addition, when subjecting the gas-barrier laminate obtained by applying a transparent primer onto the surface of the inorganic thin film to retort treatment, the inorganic thin film tends to be damaged by stress caused upon retorting, resulting in deteriorated gas-barrier property of the laminate. Further, there has also been proposed the method of applying a coating material comprising a polyfunctional isocyanate compound and a polyester polyol onto the surface of the inorganic thin film. However, in this method, it may be difficult to attain a sufficiently stable oxygen-barrier property after retorting.

DISCLOSURE OF THE INVENTION

Problem to be Solved by the Invention

Thus, an object of the present invention is to provide a gas-barrier laminate which is excellent in printability (in particular, gradation printability) and is free from deterioration in a gas-barrier property even when forming a printed layer thereon, and further exhibits an excellent adhesion between a plastic substrate and an inorganic thin film even when subjecting the laminate to retort treatments.

MEANS FOR SOLVING THE PROBLEM

As a result of the present inventors' earnest study for solving the above problems, it has been found that when a coating material containing a specific polyurethane-based resin and a specific polyester-based resin is applied onto the inorganic thin film to form a coating layer thereon, it is possible to enhance a gas-barrier property and an adhesion property of the inorganic thin film, prevent the inorganic thin film from being damaged by a pigment in printing ink, and form a printed layer which can impart a good appearance to the resultant laminate. Further, it has been found that when forming a coating layer having a specific hardness on the surface of the inorganic thin film, and/or when providing a coating layer in which a ratio of number of carbon atoms derived from carboxyl groups to number of carbon atoms constituting the surface of the coating layer lies within a specific range, it is possible to prevent the inorganic thin film from being damaged by printing ink, and maintain a good gas-barrier property of the inorganic thin film even after subjecting the laminate to hydrothermal treatment owing to less stress caused by formation of the coating layer and enhancement in bonding strength therebetween. The present invention has been attained on the basis of the above finding.

That is, in a first aspect of the present invention, there is provided a gas-barrier laminate comprising a plastic substrate (A), an inorganic thin film (B) formed on at least one surface of the plastic substrate (A), and a coating layer (C) formed by applying a coating material on a surface of the inorganic thin film (B), said coating layer (C) containing a polyester-based resin (c1) having a molecular weight of 3000 to 15000 and a polyurethane-based resin (c2) having a molecular weight of 8000 to 30000 at a weight ratio from 5/95 to 95/5, and said gas-barrier laminate having an oxygen permeability of not more than 25 fmol/m$^2$/s/Pa.

In a second aspect of the present invention, there is provided a gas-barrier laminate comprising a plastic substrate (A), an inorganic thin film (B) formed on at least one surface of the plastic substrate (A), and a coating layer (C) formed on a surface of the inorganic thin film (B), said coating layer (C) having a hardness of 0.1 to 0.5 GPa as measured at 23° C. in atmospheric air by a nano-indentation hardness testing method, and the gas-barrier laminate exhibiting an oxygen permeability of not more than 50 fmol/m$^2$/s/Pa as measured with respect to a gas-barrier film obtained by laminating an unstretched polypropylene film having a thickness of 60 μm on the coating layer (C) of the gas-barrier laminate after subjecting the gas-barrier film to hydrothermal treatment at 120° C. for 30 min.

In a third aspect of the present invention, there is provided a gas-barrier laminate comprising a plastic substrate (A), an inorganic thin film (B) formed on at least one surface of the plastic substrate (A), and a coating layer (C) formed on a surface of the inorganic thin film (B), said coating layer (C) having a hardness of 0.03 to 0.5 GPa as measured at 23° C. in water by a nano-indentation hardness testing method, and the gas-barrier laminate exhibiting an oxygen permeability of not more than 50 fmol/m$^2$/s/Pa as measured with respect to a gas-barrier film obtained by laminating an unstretched polypropylene film having a thickness of 60 μm on the coating layer (C) of the gas-barrier laminate after subjecting the gas-barrier film to hydrothermal treatment at 120° C. for 30 min.

In a fourth aspect of the present invention, there is provided a gas-barrier laminate comprising a plastic substrate (A), an inorganic thin film (B) formed on at least one surface of the plastic substrate (A), and a coating layer (C) formed on a surface of the inorganic thin film (B), said coating layer (C) having a ratio of number of carbon atoms derived from carboxyl groups to number of carbon atoms constituting the surface of the coating layer (C) of 0.005 to 0.1, and the gas-barrier laminate exhibiting an oxygen permeability of not more than 50 fmol/m$^2$/s/Pa as measured with respect to a gas-barrier film obtained by laminating an unstretched polypropylene film having a thickness of 60 μm on the coating layer (C) of the gas-barrier laminate after subjecting the gas-barrier film to hydrothermal treatment at 120° C. for 30 min.

EFFECT OF THE INVENTION

The gas-barrier laminate of the present invention is excellent in printability, in particular, gradation-printability, and is free from deterioration in a gas-barrier property, namely exhibits an excellent gas-barrier property, even when forming a printed layer thereon, and further is excellent in adhesion between the plastic substrate and the inorganic thin film and can still maintain a good gas-barrier property even after being subjected to hydrothermal treatment.

PREFERRED EMBODIMENTS OF THE INVENTION

The present invention is described in detail below.

Although typical examples of preferred embodiments of the present invention are explained hereinlater, these examples are only illustrative and not intended to limit the scope of the present invention. The gas-barrier laminate of the present invention is constituted of a plastic substrate (A), an inorganic thin film (B) formed on at least one surface of the plastic substrate (A), and a coating layer (C) formed by applying a coating material on the surface of the inorganic thin film (B).

The plastic substrate (A) used in the present invention may comprise any suitable plastic materials without particular limitations as long as they are usable as ordinary packaging materials. Examples of the plastic materials may include polyolefins such as homopolymers and copolymers of ethylene, propylene, butene, etc., amorphous polyolefins such as cyclic polyolefins, polyesters such as polyethylene terephthalate and polyethylene-2,6-naphthalate, polyamides such as nylon 6, nylon 66, nylon 12 and copolymerized nylons (hereinafter, nylons are occasionally described as a typical example of the polyamides), ethylene-vinyl alcohol copolymers (partially hydrolyzed products of ethylene-vinyl acetate copolymers; EVOH), polyimides, polyether imides, polysulfones, polyether sulfones, polyether ether ketones, polycarbonates (PC), polyvinyl butyral, polyallylates, fluororesins, acrylate resins, biodegradable resins or the like.

Specific examples of the biodegradable resins may include starch/polycaprolactone (for example, "MASTER-BE-Z" available from Nippon Gosei Co., Ltd.), polycaprolactone (for example, "CELGRUN" produced by Daicel Kagaku Co., Ltd.), polyethylene succinate ("LUNALE SE" produced by Nippon Shokubai Co., Ltd.), polybutylene succinate (for example, "BIONOLE 1001" produced by Showa Kobunsi Co., Ltd.), polybutylene succinate/adipate (for example, "BIONOLE 3001" produced by Showa Kobunsi Co., Ltd.), polyester carbonate (for example, "UPACK" produced by Mitsubishi Gas Chemical Co., Ltd.), and aromatic polyester (adipic acid) (for example, "ECOFLEX" produced by BASF AG). The above biodegradable resins except for "MASTER-BE-Z" are chemically synthesized resins. In addition to the above-exemplified biodegradable resins, there may also be used natural product-derived biodegradable resins such as cellulose acetate (for example, "CELGREEN PCA" produced by Daicel Kagaku Co., Ltd.), and chemically modified starch ("CORN POLE" available from Nippon Cornstarch Co., Ltd.).

Among these resins, preferred are polyesters, polyamides, polyolefins, ethylene-vinyl alcohol copolymers and biodegradable resins.

The plastic substrate (A) used in the present invention may be produced from the above raw materials, and may be either an unstretched substrate or a stretched substrate, or a laminated substrate with other plastic substrates. Such a plastic substrate (A) is preferably in the form of a film from the standpoint of a good productivity of thin film laminates, and may be produced by ordinary conventionally known methods. For example, the raw resin may be fed to an extruder and melted therein, extruded through a cyclic die or a T-die, and then rapidly cooled to produce an unstretched film which is substantially in an amorphous and non-oriented state. Then, the obtained unstretched film may be stretched in longitudinal and/or lateral directions thereof by ordinary conventionally known methods such as monoaxial stretching, tenter-type successive biaxial stretching, tenter-type simultaneous biaxial stretching and tubular-type simultaneous biaxial stretching, thereby obtaining a stretched film which is stretched in at least one direction.

The film thickness of the plastic substrate (A) may be determined according to properties required for a substrate of the laminate of the present invention such as mechanical strength, flexibility and transparency as well as various applications thereof, and the film thickness is usually 5 to 500 µm, preferably 10 to 200 µm. In addition, the width and length of the film as the plastic substrate (A) are not particularly limited, and may be appropriately determined according to the applications thereof.

In order to enhance adhesion between the plastic substrate (A) and the inorganic thin film (B) formed on the plastic substrate (A), an anchor coat layer is preferably provided on the plastic substrate (A). The anchor coat layer may be usually formed by applying a coating solution containing an anchor coat agent on the plastic substrate (A) by an in-line coating method or an off-line coating method.

Examples of the anchor coat agent may include solvent-soluble or water-soluble polyester resins, isocyanate resins, urethane resins, acrylic resins, vinyl alcohol resins, ethylene-vinyl alcohol resins, vinyl-modified resins, epoxy resins, oxazoline group-containing resins, modified styrene resins, modified silicone resins, and copolymer resins thereof, as well as alkyl titanates or the like. These anchor coat agents may be used alone or in combination of any two or more thereof. Among these resins, the anchor coat layer is preferably formed from at least one resin selected from the group consisting of polyester-based resins, urethane-based resins, acrylic resins, alkoxysilyl group-containing resins, oxazoline group-containing resins and copolymer resins thereof.

The thickness of the anchor coat layer is usually 0.005 to 5 µm, preferably 0.01 to 1 µm. When the thickness of the anchor coat layer is more than 5 µm, the anchor coat layer tends to be deteriorated in slip property and tends to be peeled off from the substrate film or sheet owing to an internal stress generated therein. When the thickness of the anchor coat layer is less than 0.005 µm, the anchor coat layer may fail to have a uniform thickness. Also, in order to improve a coating property and an adhesion property of the coating solution containing the anchor coat agent onto the substrate film, the surface of the substrate film may be subjected to chemical treatments or discharge treatments before applying the coating solution thereon.

Examples of inorganic materials constituting the inorganic thin film (B) formed on the plastic substrate (A) may include silicon, aluminum, magnesium, zinc, tin, nickel, titanium, carbon, and oxides, carbides and nitrides of these elements as well as mixtures of these compounds. Among these inorganic materials, preferred are silicon oxide, aluminum oxide and diamond-like carbon, and more preferred is silicon oxide because of remarkable effects upon the heat treatments of the present invention, a good transparency, and stable retention of a high gas-barrier property.

The method of forming the inorganic thin film (B) is not particularly limited, and the inorganic thin film (B) may be produced by using a vapor-deposition method, a coating method or the like. Among these methods, the vapor-deposition method is preferred because of formation of a uniform thin film having a high gas-barrier property. Examples of the vapor-deposition method may include physical vapor-deposition methods such as vacuum deposition method, ion-plating method and sputtering method, and chemical vapor-deposition methods such as CVD. The thickness of the inorganic thin film (B) is usually 0.1 to 500 nm, preferably 0.5 to 40 nm. When the thickness of the inorganic thin film (B) is less than 0.1 nm, the resultant laminate may fail to have a sufficient gas-barrier property. On the other hand, when thickness of the inorganic thin film (B) is more than 500 nm, the inorganic thin film (B) tends to suffer from cracks or peeling-off as well as poor transparency.

Next, the first aspect of the present invention is explained. The gas-barrier laminate according to the first aspect of the present invention is characterized by comprising a plastic substrate (A), an inorganic thin film (B) formed on at least one surface of the plastic substrate (A), and a coating layer (C) formed by applying a coating material on a surface of the inorganic thin film (B), wherein said coating layer (C) contains a polyester-based resin (c1) having a molecular weight of 3000 to 15000 and a polyurethane-based resin (c2) having a molecular weight of 8000 to 30000 at a weight ratio from 5/95 to 95/5, and the said gas-barrier laminate has an oxygen permeability of not more than 25 fmol/m$^2$/s/Pa.

The coating layer (C) formed on the surface of the inorganic thin film (B) contains the polyester-based resin (c1) and the polyurethane-based resin (c2) at a weight ratio from 5/95 to 95/5.

Examples of a polycarboxylic acid component constituting the polyester-based resin (c1) may include terephthalic acid, isophthalic acid, adipic acid, sebacic acid, azelaic acid, orthophthalic acid, diphenyldicarboxylic acid and dimethylphthalic acid. Examples of a polyhydric alcohol component constituting the polyester-based resin (c1) may include ethylene glycol, 1,2-propylene glycol, 1,3-propylene glycol, 1,4-butanediol, diethylene glycol, neopentyl glycol, dipropylene glycol, 1,6-hexanediol and bisphenol A.

The polyester-based resin (c1) has a molecular weight of 3000 to 15000, preferably 4000 to 13000 and more preferably 5000 to 12000. When the molecular weight of the polyester-based resin (c1) is less than 3000, the resultant coating layer tends to be too brittle and, therefore, may fail to show properties required as a protective layer. On the other hand, when the molecular weight of the polyester-based resin (c1) is more than 15000, the polyester-based resin may fail to have a high crosslinking density due to less crosslinking sites even when crosslinked with polyisocyanates, etc., and, therefore, tends to be dissolved in printing ink or swollen up therewith, resulting in poor printing appearance.

The polyester-based resin (c1) has a glass transition temperature (Tg) of usually 55 to 100° C., preferably 60 to 95° C. and more preferably 65 to 90° C. When the glass transition temperature of the polyester-based resin (c1) is less than 55° C., the obtained coating layer (C) tends to suffer from shrinkage owing to poor thermal stability thereof, resulting in deteriorated gas-barrier property and occurrence of blocking upon storage which tends to cause further deterioration in gas-barrier property as well as rough coating surface of the resultant laminate. On the other hand, when the glass transition temperature (Tg) of the polyester-based resin (c1) is more than 100° C., the adhesion between the coating layer (C) and the inorganic thin film (B) tends to be deteriorated.

The polyester-based resin (c1) has an acid value of usually 1 to 100 mgKOH/g, preferably 3 to 80 mgKOH/g and more preferably 5 to 60 mgKOH/g. When the acid value of the polyester-based resin (c1) is less than 1 mgKOH/g, the polyester-based resin may fail to have a high crosslinking density due to less crosslinking sites and, therefore, tends to be dissolved in printing ink or swollen up therewith, and the resultant laminate tends to be deteriorated in gas-barrier property. On the other hand, when the acid value of the polyester-based resin (c1) is more than 100 mgKOH/g, the polyester-based resin tends to have a too high crosslinking density due to too large number of crosslinking sites, so that the obtained coating layer (C) tends to form a hard and less-extendable coating film, and suffer from a large stress upon curing. As a result, the gas-barrier property of the resultant laminate as well as the adhesion between the coating layer (C) and the inorganic thin film (B) tend to be deteriorated.

Upon production of the polyester resin, by reacting the polycarboxylic acid component with the polyhydric alcohol component under such a condition that COOH groups are present in an excess amount relative to OH groups, it is possible to obtain a polyester having the above-mentioned molecular weight, glass transition temperature and acid value. For example, when phthalic acid, terephthalic acid, ethylene glycol and neopentyl glycol are mixed and reacted with each other, it is possible to produce a polyester having a weight-average molecular weight of 8000, an acid value of 16 mgKOH/g and a glass transition temperature of 62° C.

The polyurethane-based resin (c2) is either a urethane polymer obtained by reacting an isocyanate compound with a polymer polyol compound or a urethane polymer obtained by reacting a chain extender and a reaction stopper with a urethane prepolymer, and may have an isocyanate group bonded to a terminal end thereof. As the isocyanate compound, there may be used known aromatic isocyanates and alicyclic isocyanates. Among these isocyanates, from the viewpoint of food safety and hygiene, preferred are alicyclic diisocyanates such as isophorone diisocyanate, 1,4-cyclohexane diisocyanate, 4,4'-dicyclohexylmethane diisocyanate, hydrogenated xylylene diisocyanate, 1,3-bis(isocyanatomethyl)cyclohexane, hydrogenated diphenylmethane diisocyanate and norbornane diisocyanate, and mixtures thereof.

Examples of the polymer polyol compound reacted with the above isocyanate compound may include known polymer polyols such as polyester polyols and polyether polyols, and mixtures thereof. The polyester polyols may be produced by dehydration or condensation reaction between a dicarboxylic acid and a diol. Examples of the dicarboxylic acid may include adipic acid, suberic acid, sebacic acid, isophthalic acid, terephthalic acid, succinic acid, azelaic acid and diesters thereof such as dimethyl esters. Examples of the diol may include ethylene glycol, diethylene glycol, 1,3-propylene glycol, 1,4-butanediol, 1,5-pentanediol, 1,6-hexanediol and 3-methyl-1,5-pentanediol. These dicarboxylic acids and diols may be respectively used alone or in combination of any two or more thereof.

The polyurethane-based resin (c2) has a molecular weight of 8000 to 30000, preferably 10000 to 28000 and more preferably 12000 to 26000. When the molecular weight of the polyurethane-based resin (c2) is less than 8000, the resultant coating layer tends to be too brittle and, therefore, may fail to show properties required as a protective layer. On the other hand, when the molecular weight of the polyurethane-based resin (c2) is more than 30000, the polyurethane-based resin may fail to have a high crosslinking density due to less crosslinking sites even when crosslinked using polyisocyanates, etc., and, therefore, tends to be dissolved in printing ink or swollen up therewith, resulting in poor printing appearance.

The polyurethane-based resin (c2) has a glass transition temperature (Tg) of usually not less than 55° C., preferably 55 to 100° C. and more preferably 60 to 95° C. When the glass transition temperature (Tg) of the polyurethane-based resin (c2) is less than 55° C., the obtained coating layer (C) tends to suffer from shrinkage owing to poor thermal stability thereof, resulting in deteriorated gas-barrier property and occurrence of blocking upon storage which tends to cause further deterioration in gas-barrier property as well as rough coating surface of the resultant laminate. On the other hand, when the glass transition temperature of the polyurethane-based resin (c2) is more than 100° C., the adhesion between the coating layer (C) and the inorganic thin film (B) tends to be deteriorated.

The polyurethane-based resin (c2) has an acid value of usually 1 to 100 mgKOH/g, preferably 3 to 80 mgKOH/g and more preferably 5 to 60 mgKOH/g. When the acid value of the polyurethane-based resin (c2) is less than 1 mgKOH/g, the polyurethane-based resin may fail to have a high crosslinking density due to less crosslinking sites and, therefore, tends to be dissolved in printing ink or swollen up therewith, and the resultant laminate tends to be deteriorated in gas-barrier property. On the other hand, when the acid value of the polyurethane-based resin (c2) is more than 100 mgKOH/g, the polyurethane-based resin tends to have a too high crosslinking density due to too large number of crosslinking sites, so that the obtained coating layer (C) tends to form a hard and less-extendable coating film, and suffer from a large stress upon curing. As a result, the gas-barrier property of the resultant laminate as well as the adhesion between the coating layer (C) and the inorganic thin film (B) tend to be deteriorated.

The mixing ratio (weight ratio) of the polyester-based resin (c1) to the polyurethane-based resin (c2) in the coating material is usually 5/95 to 95/5, preferably 10/90 to 90/10 and more preferably 15/85 to 85/15. When the mixing ratio (weight ratio) of the polyester-based resin (c1) to the polyurethane-based resin (c2) in the coating material is more than 95/5, the adhesion between the coating layer (C) and the inorganic thin film (B) tends to be deteriorated. On the other hand, when the mixing ratio (weight ratio) of the polyester-based resin (c1) to the polyurethane-based resin (c2) is less than 5/95, the resultant laminate tends to be deteriorated in gas-barrier property.

The coating layer (C) preferably contains a silane coupling agent in order to enhance the adhesion to the inorganic thin film (B). The amount of the silane coupling agent used is usually 0.1 to 20% by weight and preferably 0.1 to 3% by weight based on the weight of the coating layer (C). As the silane coupling agent, there are preferably used epoxy group-containing silane coupling agents and amino group-containing silane coupling agents. Examples of the epoxy group-containing silane coupling agents may include β-(3,4-epoxycyclohexyl)ethyl trimethoxysilane, γ-glycidoxypropylmethyl diethoxysilane and γ-glycidoxypropyl trimethoxysilane. Examples of the amino group-containing silane coupling agents may include γ-aminopropyl trimethoxysilane, N-β-(aminoethyl) γ-aminopropylmethyl diethoxysilane, N-β-(aminoethyl) γ-aminopropyl trimethoxysilane and N-β-(aminoethyl) γ-aminopropyl triethoxysilane. These silane coupling agents may be used alone or in combination of any two or more thereof. Among these silane coupling agents, especially preferred are γ-glycidoxypropyl trimethoxysilane and γ-aminopropyl trimethoxysilane.

For the purpose of enhancing a coatability of printing ink on the coating layer (C) as well as a gas-barrier property thereof, the coating material forming the coating layer (C) preferably contains at least one compound selected from the group consisting of aliphatic hydrocarbon-based compounds such as liquid paraffins, microcrystalline waxes, natural paraffins, synthetic paraffins and polyethylene; fatty acid-based compounds such as stearic acid, lauric acid, hydroxystearic acid and hardened castor oil; fatty amide-based compounds such as stearamide, oleamide, erucamide, lauramide, palmitamide, behenamide, ricinolamide, oxystearamide, methylenebisstearamide, ethylenebisstearamide, ethylenebisoleamide, ethylenebisbehenamide and ethylenebislauramide; metals salts of fatty acids having 12 to 30 carbon atoms such as sodium stearate, calcium stearate and calcium hydroxystearate; fatty ester-based compounds, e.g., polyhydric alcohol fatty (partial) ester-based compounds such as glycerol fatty esters, hydroxystearic acid triglyceride and sorbitan fatty esters, and long-chain ester waxes such as butyl stearate and montan wax; and composite compounds thereof.

Among the above compounds added to the coating material, preferred are fatty acid-based compounds, fatty amide-based compounds and fatty ester-based compounds, and more preferred are fatty amide-based compounds. The amount of the compound added to the above coating material is usually 0.05 to 20 parts by weight and preferably 0.1 to 10 parts by weight based on 100 parts by weight of a sum of the polyester-based resin (c1) and the polyurethane-based resin (c2). When the amount of the compound added to the coating material is less than 0.05 part by weight, a sufficient effect of improving the gas-barrier property may not be attained, and the printing appearance tends to be deteriorated. When the amount of the compound added to the coating material is more than 20 parts by weight, the adhesion between the coating layer (C) and the inorganic thin film (B) tends to be deteriorated.

The coating material containing the polyester-based resin (c1) and the polyurethane-based resin (c2) may be prepared by dissolving the polyester-based resin and the polyurethane-based resin in an organic solvent. The total concentration of the polyester-based resin (c1) and the polyurethane-based resin (c2) in the coating material is usually 20 to 50% by weight. The organic solvent used for the preparation of the coating material is not particularly limited as long as the polyester-based resin (c1) and the polyurethane-based resin (c2) can be dissolved therein. Examples of the organic solvent may include esters such as ethyl acetate and butyl acetate, ketones such as methyl ethyl ketone and methyl isobutyl ketone, and aromatic hydrocarbons such as toluene and xylene. These organic solvents may be used alone or in the form of a mixture of any two or more thereof. Among these organic solvents, preferred is a mixed solvent of toluene and methyl ethyl ketone. Further, a polyisocyanate as a curing agent is preferably added to the coating material upon use.

The polyisocyanates added to the coating material are not particularly limited, and there may be used any suitable polyisocyanates which are conventionally known as crosslinking agents. Examples of the preferred polyisocyanates may include polyisocyanates containing 3 or more active isocyanate groups in a molecule thereof and having an isocyanate group content of not less than 12% by weight (calculated as the solid content). Specific examples of the polyisocyanates may include aliphatic polyisocyanates such as hexamethylene diisocyanate, xylene diisocyanate and dicyclohexylmethane diisocyanate; and aromatic polyisocyanates such as tolylene diisocyanate, diphenylmethane diisocyanate, polymethylene polyphenylene diisocyanate, tolidine diisocyanate and naphthalene diisocyanate. Examples of the commercially available polyisocyanates may include "CORONATE L" produced by Nippon Polyurethane Co., Ltd., or the like. The amount of the polyisocyanate used is usually 0.8 to 1.5 times the total hydroxyl equivalent of the polyester-based resin (c1) and the polyurethane-based resin (c2). When the amount of the polyisocyanate used is less than 0.8 time the total hydroxyl equivalent of the polyester-based resin (c1) and the polyurethane-based resin (c2), the amount of the isocyanate groups tends to be insufficient, so that the resultant coating layer (C) may fail to exhibit a sufficient crosslinking density, resulting in insufficient resistance to solvents contained in printing ink. On the other hand, when the amount of the polyisocyanate used is more than 1.5 times the total hydroxyl equivalent of the polyester-based resin (c1) and the polyurethane-based resin (c2), the amount of the isocyanate groups tends to be excessive, so that the resultant coating layer (C) tends to be too hard and deteriorated in flexibility.

In addition, the coating layer (C) may also contain various known additives such as antistatic agents, light-shielding agents, ultraviolet absorbers, plasticizers, fillers, colorants, stabilizers, defoaming agents, crosslinking agents, antiblocking agents and antioxidants.

The thickness of the coating layer (C) is usually 0.05 to 5 μm and preferably 0.1 to 2 μm. When the thickness of the coating layer (C) is less than 0.05 μm, the inorganic thin film (B) may be damaged upon printing. When the thickness of the coating layer (C) is more than 5 μm, the transferring property of printing ink thereonto tends to be deteriorated.

The gas-barrier laminate according to the first aspect of the present invention has an oxygen permeability of usually not more than 25 fmol/m$^2$/s/Pa and preferably not more than 15 fmol/m$^2$/s/Pa. The lower limit of the oxygen permeability of the gas-barrier laminate is usually not less than 0.05 fmol/m$^2$/s/Pa. The gas-barrier laminate has a water vapor permeability of usually not more than 5 g/m$^2$/day and preferably not more than 3 g/m$^2$/day. The lower limit of the water vapor permeability of the gas-barrier laminate is usually not less than 0.01 g/m$^2$/day.

Next, the second through fourth aspects of the present invention are described. The gas-barrier laminates according to the second through fourth aspects of the present invention are respectively constituted of the plastic substrate (A), the inorganic thin film (B), and the coating layer (C) formed by applying the coating material on the surface of the inorganic thin film (B). The gas-barrier laminate according to the second aspect of the present invention is characterized in that the coating layer (C) has a hardness of 0.1 to 0.5 GPa and preferably 0.2 to 0.4 GPa as measured at 23° C. in atmospheric air by a nano-indentation hardness testing method. The gas-barrier laminate according to the third aspect of the present invention is characterized in that the coating layer (C) has a hardness of 0.03 to 0.5 GPa and preferably 0.1 to 0.4 GPa as measured at 23° C. in water by a nano-indentation hardness testing method. The gas-barrier laminate according to the fourth aspect of the present invention is characterized in that the coating layer (C) has a ratio of number of carbon atoms derived from carboxyl groups to number of carbon atoms constituting the surface of the coating layer (C) of 0.005 to 0.1 and preferably 0.008 to 0.05. The gas-barrier laminate of the present invention more preferably exhibits two or more characteristics specified in these second through fourth aspects above. In the followings, the second through fourth aspects are explained in detail.

The nano-indentation hardness testing method (nano-indentation hardness measuring method) means such a method in which a module for measuring an indentation hardness (constituted of a transducer and an indentator) is attached to AFM (atomic force microscope) to measure an indentation hardness in a nano level. In the measurement, a load controlled by the transducer is applied to the indentator to detect an indentation depth of a sample. The details of the hardness measuring method is described in Examples below.

Also, the ratio of number of carbon atoms derived from carboxyl groups to number of carbon atoms constituting the surface of the coating layer (C) is measured by the methods described in "J. Polym. Sci.", Part A, Vol. 26, pp. 559-572 (1988), and Japanese Patent No. 3139522. The details of the ratio measuring method are also described in Examples below.

When the hardness of the coating layer (C) as measured at 23° C. in atmospheric air by a nano-indentation hardness testing method is too high, the coating layer may fail to follow the dimensional change of the laminate as a whole when subjected to hydrothermal treatment, resulting in deteriorated barrier property thereof after the hydrothermal treatments. When the hardness of the coating layer (C) as measured at 23° C. in atmospheric air by a nano-indentation hardness testing method is too low, the gradation of printing tends to be lowered.

When the hardness of the coating layer (C) as measured at 23° C. in water by a nano-indentation hardness testing method is too high, the coating layer may fail to follow the dimensional change of the laminate as a whole when subjected to hydrothermal treatment, resulting in deteriorated barrier property thereof after the hydrothermal treatment. When the hardness of the coating layer (C) as measured at 23° C. in water by a nano-indentation hardness testing method is too low, the adhesion between the respective layers tends to be deteriorated when subjected to the hydrothermal treatment.

Meanwhile, even though the hardness of the coating layer (C) as measured at 23° C. in an atmospheric air by a nano-indentation hardness testing method is out of the above-specified range, when the hardness of the coating layer (C) as measured at 23° C. in water by a nano-indentation hardness testing method lies within the above-specified range, the gas-barrier laminate can exhibit the aimed effects of the present invention owing to moisture absorption thereof upon retorting.

When the ratio of number of carbon atoms derived from carboxyl groups to number of carbon atoms constituting the surface of the coating layer (C) is too small, the adhesion strength between the respective layers in water tends to be lowered. When the ratio of number of carbon atoms derived from carboxyl groups to number of carbon atoms constituting the surface of the coating layer (C) is too large, the coating solution prepared for forming the coating layer (C) tends to readily suffer from hydrolysis, resulting in unstable properties of the obtained coating layer (C).

Examples of resins used for forming the coating layer (C) may include polyester-based resins, polyurethane-based resins, acrylic resins, alkoxysilyl group-containing resins, oxazoline-based resins, epoxy-based resins and melamine-based resins. These resins may contain a crosslinking agent component. Among these resins, the coating layer (C) is preferably formed from at least one resin selected from the group consisting of polyester-based resins, urethane-based resins, acrylic resins, alkoxysilyl group-containing resins, oxazoline group-containing resins and copolymer resins thereof. In order to control the hardness of the coating layer (C) in atmospheric air or water to the above-specified ranges, the above resins may be suitably used in the form of a block and/or graft copolymer, or a mixture of two or more different kinds of resins or a mixture of two or more resins of the same type which are however different in molecular weight or molecular weight distribution from each other.

As the above polyester-based resins, there may be used the polyester-based resins (c1) described in the first aspect of the present invention. The polycarboxylic acid component forming the polyester-based resins as well as the molecular weight, glass transition temperature (Tg), acid value and production method thereof are the same as those described in the first aspect of the present invention.

When the polyester-based resin containing a large number of carboxyl groups bonded to terminal ends and/or side chains thereof is used as the coating material, it is possible to adjust the ratio of number of carbon atoms derived from carboxyl groups to number of carbon atoms constituting the surface of the coating layer (C) to not less than 0.005. As the resin containing a large number of carboxyl groups bonded to terminal ends and/or side chains thereof, for example, the polyester-based resins may be produced by copolymerizing the trivalent or more polycarboxylic acids as described in Japanese Patent Application Laid-open (KOKAI) Nos. 54-46294, 60-209073, 62-240318, 53-26828, 53-26829, 53-98336, 56-116718 and 61-124684.

Examples of the preferred polycarboxylic acid may include trimellitic acid, trimellitic anhydride, pyromellitic acid, pyromellitic anhydride, 4-methylcyclohexene-1,2,3-tricarboxylic acid, trimesic acid, 1,2,3,4-butanetetracarboxylic acid, 1,2,3,4-pentanetetracarboxylic acid, 3,3',4,4'-benzophenonetetracarboxylic acid, 5-(2,5-dioxotetrahydrofurfuryl)-3-methyl-3-cyclohexene-1,2-dicarboxylic acid, 5-(2,5-dioxotetrahydrofurfuryl)-3-cyclohexene-1,2-dicarboxylic acid, cyclopentanetetracarboxylic acid, 2,3,6,7-naphthalenetetracarboxylic acid, 1,2,5,6-naphthalenetetracarboxylic acid, ethylene glycol bistrimellitate, 2,2',3,3'-diphenyltetracarboxylic acid, thiophene-2,3,4,5-tetracarboxylic acid and ethylenetetracarboxylic acid. Among these polycarboxylic acids, preferred is 5-(2,5-dioxotetrahydrofurfuryl)-3-methyl-3-cyclohexene-1,2-dicarboxylic acid.

As the above polyurethane-based resins, there may be used the polyurethane-based resins (c2) described in the first aspect of the present invention. The isocyanate compound and the polymer polyol compound forming the polyurethane-based resins as well as the molecular weight, glass transition temperature (Tg), acid value and production method thereof are the same as those described in the first aspect of the present invention.

Further, in addition to the polyurethane-based resins (c2) described in the first aspect of the present invention, there may also be used polyester urethanes or the like as described in Japanese Patent Application Laid-open (KOKAI) No. 61-228030, etc. Examples of the carboxylic acid component of the polyester urethanes may include pendant carboxyl groups such as those groups derived from 2,2-dimethylolpropionic acid and 2,2-dimethylolbutyric acid. These carboxyl groups may be introduced into the polyester urethanes by the methods as described in Japanese Patent Publication (KOKOKU) No. 52-3438, etc.

The acrylic resins may be produced using monomers containing an anion-type carboxyl group as a hydrophilic group as described in "Water-based paints and coating techniques" edited by Gijutsu Joho Kyokai Co., Ltd. More specifically, the acrylic resins may be produced by copolymerizing acrylic acid with methyl methacrylate.

The alkoxysilyl group-containing resins may be produced by hydrolysis of alkoxysilanes as described in Japanese Patent Application Laid-open (KOKAI) Nos. 2000-63661 and 2000-160067. More specifically, the alkoxysilyl group-containing resins may be produced by previously modifying polyurethane with alkoxysilanes, or further curing the modified polyurethane with hydrolyzable alkoxysilanes by a sol-gel method.

Examples of the oxazoline-based resins may include "EPOCROSS K-1000", "EPOCROSS K-2000", "EPOCROSS WS-500" and "EPOCROSS WS-700" all produced by Nippon Shokubai Co., Ltd., etc.

Examples of the epoxy resins may include epoxy polyamide resins, silicone-modified epoxy resins, esters of epoxy resins, epoxy phenol resins and epoxy alkyd resins.

Examples of the melamine-based resins may include etherified melamine resins and alkylated melamine resins.

As the crosslinking agent component (curing agent), there may be used conventionally known curing agents. Among these curing agents, especially preferred are polyisocyanates. As the polyisocyanates, there may be used those polyisocyanates as described in the first aspect of the present invention. Specific examples of the polyisocyanates and the amount used are the same as those described in the first aspect of the present invention.

In order to enhance the adhesion between the coating layer (C) and the inorganic thin film (B), the silane coupling agent as described in the first aspect of the present invention is preferably added to the coating layer (C). The amount used and specific examples of the silane coupling agent are the same as those described in the first aspect of the present invention.

For the purposes of enhancing a coatability of printing ink and a gas-barrier property of the resultant laminate, the coating material forming the coating layer (C) may also contain at least one additive as described in the first aspect of the present invention. The kinds of preferred additives and the amount blended are the same as those described in the first aspect of the present invention.

In addition, the coating layer (C) may also contain conventionally known additives as described in the first aspect of the present invention. The thickness of the coating layer (C) is also the same as described in the first aspect of the present invention.

In the following descriptions, common items of the gas-barrier laminates according to the first through fourth aspects of the present invention are explained.

In the gas-barrier laminates of the present invention, a printed layer may be formed on the coating layer (C), and further the other plastic substrate or a paper substrate may be laminated on the printed layer. As the printing ink for forming the printed layer, there may be used water-based or solvent-based resin-containing printing inks. Examples of the resins used in the printing inks may include acrylic resins, urethane-based resins, polyester-based resins, vinyl chloride-based resins, vinyl acetate copolymer resins, and mixtures thereof. In addition, the printing inks may contain various known additives such as antistatic agents, light-shielding agents, ultraviolet absorbers, plasticizers, slip agents, fillers, colorants, stabilizers, lubricants, defoaming agents, crosslinking agents, anti-blocking agents, antioxidants or the like.

The method of forming the printed layer is not particularly limited, and the printed layer may be produced by known printing methods such as offset printing method, gravure printing method and screen printing method. The drying of the printed layer for removing the solvent therefrom may also be conducted by known methods such as hot-air drying method, hot-roll drying method and infrared drying method.

When a heat sealable resin is used as a material of the other plastic substrate to be laminated on the printed layer, the resultant laminate can exhibit a good heat-sealability and, therefore, may be used to produce various containers, especially retort containers. More specifically, a laminate having such a layer structure comprising the plastic substrate (A)/the inorganic thin film (B)/the coating layer (C)/the printed layer/the other heat-sealable plastic substrate (heat seal layer) (hereinafter referred to merely as a "gas-barrier film") may be formed into a retort container having an excellent gas-barrier property by using the other heat-sealable plastic substrate as an inside layer thereof.

Further, at least one layer made of a paper or plastic film may be laminated between the printed layer and the heat seal layer. As the plastic film, there may be used films made of the same plastic material as used for the plastic substrate (A). Among these materials, preferred are papers, polyester resins, polyamide resins and biodegradable resins from the standpoint of ensuring sufficient rigidity and strength of the resultant laminate. In particular, when a stretched polyamide resin layer is laminated between the printed layer and the heat seal layer, the resultant laminate can exhibit a good gas-barrier property even after subjected to hydrothermal treatment. For this reason, the stretched polyamide resin layer preferably has a hot water shrinkage rate of not more than 15% as measured using a 127° C. hot water. When the hot water shrinkage rate of the stretched polyamide resin layer is more than 15%, the resultant laminate tends to be deteriorated in barrier property and adhesion property owing to stress caused by dimensional change thereof upon the hydrothermal treatment.

Examples of the above heat-sealable resins may include known resins such as polyethylene resins, polypropylene resins, ethylene-vinyl acetate copolymer resins, ionomer resins, EAA resins, EMAA resins, EMA resins, EMMA resins, EEA resins and biodegradable resins. The heat seal layer may be laminated on the printed layer by dry lamination method using an adhesive or extrusion lamination method using an adhesive resin.

The gas-barrier film obtained by laminating the printed layer and the heat seal layer on the gas-barrier laminate of the present invention exhibits an oxygen permeability of usually not more than 25 $fmol/m^2/s/Pa$ and preferably not more than 10 $fmol/m^2/s/Pa$. The lower limit of the oxygen permeability of the gas-barrier film is usually not less than 0.025 $fmol/m^2/s/Pa$. Meanwhile, the gas-barrier laminate of the present invention which comprises the plastic substrate (A), the inorganic thin film (B) and the coating layer (C) has an oxygen permeability of not more than 25 $fmol/m^2/s/Pa$ as described above. These gas-barrier laminates and the gas-barrier films having the above-specified oxygen permeability are classified into so-called high gas-barrier films. The gas-barrier laminates and the gas-barrier films according to the present invention are characterized in that the gas-barrier property thereof is less deteriorated even after subjected to hydrothermal treatment under pressure such as so-called retort treatment. In particular, when the gas-barrier laminate of the present invention is heat-treated, it is possible to efficiently impart the above properties thereto.

More specifically, the heat treatment may be conducted after laminating the inorganic thin film (B) on the plastic substrate (A), after obtaining the gas-barrier laminate of the present invention by further laminating the coating layer (C) on the inorganic thin film (B), or after further laminating the other plastic film and/or a paper on the coating layer (C), thereby enabling the gas-barrier film to be produced. After subjecting the resultant gas-barrier film to hydrothermal treatment at 120° C. for 30 min, the gas-barrier film exhibits an oxygen permeability of not more than 50 fmol/m$^2$/s/Pa, preferably not more than 25 fmol/m$^2$/s/Pa, more preferably not more than 10 fmol/m$^2$/s/Pa and especially preferably not more than 5 fmol/m$^2$/s/Pa.

The above heat treatment may be usually applied to the gas-barrier film or the gas-barrier laminate. As the method of subjecting the gas-barrier film to the heat treatment, there may be used either the method of subjecting a container, a bag, etc., which are fabricated from the gas-barrier film, to the heat treatment, or the method of subjecting the fabricated container or bag filled with contents to the heat treatment. Although optimum conditions of the heat treatment vary depending upon kind and thickness of the respective components constituting the gas-barrier film or gas-barrier laminate, any methods may be used without particular limitations as long as the time and temperature used therein can be maintained as required. For example, there may be used the method of preserving the film or laminate in an oven or constant-temperature chamber set to the temperature as required, the method of blowing a hot air to the film or laminate, the method of heating the film or laminate by an infrared heater, the method of irradiating the film or laminate with light from a lamp, the method of directly applying heat to the film or laminate by contacting with a heated roll or a heated plate, or the method of irradiating the film or laminate with a microwave. In this case, the gas-barrier film or gas-barrier laminate may be cut into a suitable size which is easy to handle, and then subjected to the heat treatment. Alternatively, the rolled film or laminate may be directly subjected to the heat treatment. In addition, as long as the required time and temperature are ensured, a suitable heating device may be incorporated into a part of a film-forming apparatus such as a coater and a slitter to conduct the heat treatment during the production process of the gas-barrier film or gas-barrier laminate.

The temperature used in the above heat treatment is not particularly limited as long as the temperature lies within the range of usually not less than 60° C. and not more than the melting point of the plastic substrate (A) or the plastic film used. The lower limit of the heat-treating temperature is preferably 70° C., whereas the upper limit of the heat-treating temperature is usually 200° C. and preferably 160° C. When the heat-treating temperature is less than 60° C., the time required until exhibiting the effects of the heat treatment is extremely prolonged, resulting in unpractical process. The heat-treating time tends to be shortened as the heat-treating temperature is raised. Further, when the heat-treating temperature is too high, the gas-barrier film or the gas-barrier laminate tends to be deteriorated in gas-barrier property due to heat decomposition of components thereof. Therefore, the heat-treating time is preferably shortened. Consequently, the suitable heat treatment conditions include, for example, from about 3 days to about 6 months at 60° C., from about 3 hours to about 10 days at 80° C., from about one hour to about one day at 120° C. and from about 3 to 60 min at 150° C., although the above-specified conditions are merely illustrative and, therefore, may vary depending upon kind and thickness of the components constituting the gas-barrier film or the gas-barrier laminate.

In the gas-barrier laminate and the gas-barrier film of the present invention, the adhesion strength between the plastic substrate (A) and the inorganic thin film (B) as measured after subjecting the laminate or film to the hydrothermal treatment under pressure at 120° C. for 30 min, is usually not less than 100 g/15 mm and preferably not less than 200 g/15 mm notwithstanding whether the laminate or film is heat-treated or not. Meanwhile, when subjecting the laminate or film to no heat treatment, the anchor coat layer is preferably provided between the plastic substrate (A) and the inorganic thin film (B) to achieve the same adhesion strength therebetween as that of the heat-treated laminate or film. Further, in the case of the laminate or film obtained by forming the printed layer and the heat seal layer on the gas-barrier laminate of the present invention, the adhesion strength between the printed layer and the coating layer (C) as measured after subjecting the laminate or film to the hydrothermal treatment under pressure at 120° C. for 30 min, is usually not less than 100 g/15 mm and preferably not less than 200 g/15 mm. Also, the change in shrinkage percentage of the gas-barrier laminate or the gas-barrier film of the present invention between before and after subjecting the laminate or film to the hydrothermal treatment under pressure is usually not more than 3% and preferably not more than 2%.

EXAMPLES

The present invention is described in more detail below by the following examples, but these examples are only illustrative and not intended to limit the scope of the present invention. Meanwhile, Examples 1 to 21 and Reference Examples 1 to 11 are concerned with the first aspect of the present invention, whereas Examples 22 to 34 and Reference Examples 12 to 17 are concerned with the second through fourth aspects of the present invention. In the following Examples and Reference Examples, various properties were measured by the following methods.

(1) Oxygen Permeability (fmol/m$^2$/s/Pa):

The oxygen permeability was measured at a temperature of 25° C. and a relative humidity of 80% using an oxygen permeability measuring apparatus "OX-TRAN100" manufactured by Modern Control Corp., according to ASTM-D3985. Evaluation criteria are as follows:

A: not more than 5 fmol/m$^2$/s/Pa;

B: more than 5 fmol/m$^2$/s/Pa but not more than 15 fmol/m$^2$/s/Pa;

C: more than 15 fmol/m$^2$/s/Pa but not more than 25 fmol/m$^2$/s/Pa; and

D: more than 25 fmol/m$^2$/s/Pa.

(2) Adhesion Strength:

As a sample film, there was used a laminate comprising a plastic substrate/a surface-modifying layer/an inorganic thin film/a coating layer/a printed layer/an adhesive layer/the other plastic film, which laminate was in the form of a strip-like film having a width of 15 mm and a length of 100 mm and in which a spacer made of a release paper was disposed in place of a part of the adhesive layer on its half (½)-length portion (i.e., a portion having a width of 15 mm and a length of 50 mm) for forming an adhesive layer-free region therein. The formed laminate was subjected to T-peel test in which an (A) side of the laminate comprising the plastic substrate, the surface-modifying layer, the inorganic thin film, the coating layer and the printed layer and a (B) side thereof comprising the other plastic film was respectively peeled off from each other from the side of the adhesive layer-free region. More specifically, respective end portions of the A and B sides of the sample film were clamped with a stationary gripper and a movable gripper of an autograph "DSS-100" (testing apparatus according to JIS K 7127) manufactured by Shimadzu Corporation, at 23° C. and 50% RH, and the sample film was fitted to the testing apparatus such that a distance between the respective grippers was 60 mm. Then, the movable gripper was moved by 30 mm at a pulling velocity of 300 mm/min to measure and record a tensile load applied using a strain gauge and obtain a center line value thereof from the thus prepared characteristic curve of tensile load. Three sample films were tested to determine an average thereof. Evaluation criteria are as follows:

A: not less than 300 g/15 mm;
B: less than 300 g/15 mm but not less than 200 g/15 mm;
C: less than 200 g/15 mm but not less than 100 g/15 mm; and
D: less than 100 g/15 mm.

(3) Gradation Printability:

Using a gravure ink as a printing ink and a printer "FE-185" manufactured by Fuji Kikai Kogyo Co., Ltd., printing patterns (half-tone dots) composed of black, indigo blue, red, yellow and white colors were formed on the coating layer of a sample film at a printing speed of 100 m/min to examine a reproducibility of concentrations of half-tone dots in the printing patterns, thereby evaluating the gradation printability. Meanwhile, as a control for evaluation of the gradation printability, there was used printing patterns formed on a polyethylene terephthalate (PET) film. Evaluation criteria are as follows:

A: Degree of spread of the half-tone dots was identical to that on PET film;
B: Degree of spread of the half-tone dots was smaller than that on PET film, but still kept large;
C: Degree of spread of the half-tone dots was small, and apparent concentration was considerably lowered; and
D: No spread of the half-tone dots was observed.

(4) Measurement of Hardness of Coating Layer (C) by Nano-Indentation Hardness Testing Method:

Using a scanning type probe microscope "Nanoscope IIIa" manufactured by Digital Instrument Inc., and an extra-light load thin film hardness tester "Triboscope system" manufactured by Hysitron Inc., the hardness of the coating layer (C) by a nano-indentation hardness testing method was measured under the following conditions:

Pretreatment of sample: Cutting the gas-barrier laminate and fixing the cut laminate onto a silicon substrate through an adhesive.

Indentator: Berkovich shape (triangular pyramid shape) made of diamond.

Indentation depth: Depth undergoing no adverse influence by base film (about 1/10 of thickness of coating layer).

Measuring position: Where no inorganic filler was present when observed by an atomic force microscope, and which was kept flat.

Measuring atmosphere:
Measurement in atmospheric air: 23° C.; 50% RH
Measurement in water: 23° C.

(5) Ratio of Number of Carbon Atoms Derived from Carboxyl Groups to Number of Carbon Atoms Constituting the Surface of the Coating Layer (C):

Using an X-ray photoelectric spectral analyzer "2201KL" manufactured by VG Inc., the ratio was measured under the following conditions:

Excitation $\lambda$-ray: single color A1; $K\alpha_{1,2}$ ray (1486.6 eV);
X-ray diameter: 1 mm;
X-ray output: 10 kV, 20 mA;
Photoelectron emission angle: 90°

Meanwhile, in a carboxyl group gas-phase chemical modification of the gas-barrier laminate, a carboxyl group present on a surface of the laminate was esterified with trifluoroethanol in a desiccator in atmospheric air using a catalyst composed of pyridine and dicyclohexyl carbodiimide, thereby labeling the carboxyl group. Also, a polyacrylic acid film as a standard sample was subjected to the gas-phase chemical modification simultaneously with that of the gas-barrier laminate. From the measurement of the standard sample, a reaction rate of trifluoroethanol and a residual percentage of dicyclohexyl carbodiimide were determined, and the ratio of number of carbon atoms derived from carboxyl groups to number of carbon atoms constituting the surface of the coating layer (C) (COOH/C) was calculated therefrom by the methods described in "J. Polym. Sci.", Part A, Vol. 26, pp. 559-572 (1988), and Japanese Patent No. 3139522.

Production of Resin A for Anchor Coat Layer (Aqueous Acrylic Resin):

A mixed monomer comprising 40 parts by weight of ethyl acrylate, 30 parts by weight of methyl methacrylate, 20 parts by weight of methacrylic acid and 10 parts by weight of glycidyl methacrylate was subjected to solution polymerization in ethanol. After completion of the polymerization, the reaction solution was heated while adding water thereto to remove ethanol therefrom. The pH value of the reaction solution was adjusted to 7.5 by adding aqueous ammonia thereto, thereby obtaining an aqueous acrylic resin paint.

Production of Resin B for Anchor Coat Layer (Aqueous Polyurethane Resin):

First, a polyester polyol was produced from 664 parts by weight of terephthalic acid, 631 parts by weight of isophthalic acid, 472 parts by weight of 1,4-butanediol and 447 parts by weight of neopentyl glycol as raw materials. Next, the obtained polyester polyol was mixed with 321 parts by weight of adipic acid and 268 parts by weight of dimethylolpropionic acid, thereby obtaining a pendant carboxyl group-containing polyester polyol A. Further, 1880 parts by weight of the obtained polyester polyol A was mixed with 160 parts by weight of hexamethylene diisocyanate, thereby obtaining an aqueous polyurethane-based resin paint.

Production of Coating Resin C (Alkoxysilyl Group-Containing Resin):

148 parts by weight of a polyester polyol "KURAPOL P2010" produced by Kuraray Co., Ltd., and 222 parts by weight of a polyester polyol "PLACCEL 220" produced by Daicel Chemical Industries, Ltd., were mixed with 102.7 parts by weight of isophorone diisocyanate and 27.2 parts by weight of 3-aminopropyl triethoxysilane, thereby producing an alkoxysilyl group-containing polyurethane paint.

Production of Vapor-Deposited Polyethylene Tereohthalate (PET) Film:

Polyethylene terephthalate (PET; melt viscosity: 0.65) was extruded at 290° C. through a T-die, and then rapidly cooled on a cooling drum, thereby obtaining an unstretched PET sheet having a thickness of 150 µm. The obtained PET sheet was longitudinally stretched at 95° C. and a stretch ratio of 3.5 times, and then an aqueous solution composed of a mixed resin containing 60% by weight of an oxazoline group-containing polymer "EPOCROSS WS-500" produced by Nippon Shokubai Co., Ltd., 20% by weight of the resin A for anchor coat layer (aqueous acrylic resin) and 20% by weight of the resin B for anchor coat layer (aqueous polyurethane resin) was applied onto the longitudinally stretched PET sheet by an in-line coating method. The resultant coated sheet was further laterally stretched at 110° C. and a stretch ratio of 3.5 times, and then heat-treated at 230° C., thereby obtaining a 12.1 µm-thick biaxially stretched PET film provided thereon with an anchor coat layer made of the above mixed resin having a thickness of 0.1 µm.

Next, silicon oxide was vapor-deposited on the anchor coat layer by a high-frequency heating method using a vacuum deposition apparatus to form an inorganic thin film layer made of silicon oxide having a thickness of about 10 nm, thereby obtaining a silicon oxide-deposited PET film. Separately, the same vapor deposition procedure was conducted except that aluminum was used as a material to be vapor-deposited and oxygen was introduced thereinto to form an inorganic thin film layer made of aluminum oxide having a thickness of about 10 nm, thereby obtaining an aluminum oxide-deposited PET film. As a result, it was confirmed that the obtained silicon oxide-deposited PET film had an oxygen permeability of 11 fmol/m$^2$/s/Pa, whereas the obtained aluminum oxide-deposited PET film had an oxygen permeability of 9 fmol/m$^2$/s/Pa.

Production of Vapor-Deposited Nylon Film:

Nylon 6 containing 50% by weight of regenerated nylon 6 ("NOPAMIDE 1020" produced by Mitsubishi Chemical Corporation; relative viscosity: 3.5) was extruded at 230° C. through a T-die and then rapidly cooled on a cooling drum, thereby obtaining an unstretched nylon sheet having a thickness of 144 μm. The resultant nylon sheet was longitudinally stretched at 60° C. and a stretch ratio of 3 times, and then an aqueous solution composed of a mixed resin containing 60% by weight of an oxazoline group-containing polymer "EPOCROSS WS-500" produced by Nippon Shokubai Co., Ltd., 20% by weight of the resin A for anchor coat layer (aqueous acrylic resin) and 20% by weight of the resin B for anchor coat layer (aqueous polyurethane resin) was applied onto the longitudinally stretched nylon sheet by an in-line coating method. The resultant coated sheet was further laterally stretched at 90° C. and a stretch ratio of 3 times and then heat-treated at 205° C., thereby obtaining a 16 μm-thick biaxially stretched nylon film.

Next, silicon oxide was vapor-deposited on the anchor coat layer by a high-frequency heating method using a vacuum deposition apparatus to form an inorganic thin film layer made of silicon oxide having a thickness of about 10 nm, thereby obtaining a silicon oxide-deposited nylon film. As a result, it was confirmed that the obtained silicon oxide-deposited nylon film had an oxygen permeability of 25 fmol/m$^2$/s/Pa.

Example 1

A coating material was applied onto the silicon oxide thin film formed on the silicon oxide-deposited PET film, and then dried at 100° C. for 60 s to form a 0.5 μm-thick coating layer thereon. The coating material was composed of 10 parts by weight of a polyester resin having a glass transition temperature of 57° C., a molecular weight of 3000 and an acid value of 42 mgKOH/g, 10 parts by weight of a polyurethane resin having a glass transition temperature of 75° C., a molecular weight of 8000 and an acid value of 20 mgKOH/g, 1 part by weight of γ-glycidoxypropyl trimethoxysilane as a silane coupling agent, 1 part by weight of stearamide as a fatty amide-based compound, 39 parts by weight of toluene and 39 parts by weight of methyl ethyl ketone (MEK), and further contained a polyisocyanate "CORONATE L" produced by Nippon Polyurethane Industry Co., Ltd., in an amount of 1.2 times a total hydroxyl equivalent of the polyester resin and the polyurethane resin (refer to Tables 1 and 2). Meanwhile, in the following Examples and Reference Examples, the total amount of the polyester resin and the polyurethane resin used in the coating material was 20 parts by weight. As a result, it was confirmed that the obtained silicon oxide-deposited PET film had an oxygen permeability of 6 fmol/m$^2$/s/Pa.

Using a gravure printing ink, printing patterns composed of 5 colors including black, indigo blue, red, yellow and white were formed on the coating layer of the silicon oxide-deposited PET film to evaluate a transfer property of the printing patterns.

Further, a urethane-based adhesive (mixture containing adhesives "AD-900" and "CAT-RT85" both produced by Toyo Morton Co., Ltd., at a blending ratio of 10:1.5) was applied onto the surface of the printed layer formed on the silicon oxide-deposited PET film, and then dried, thereby forming an adhesive resin layer having a thickness of 4 μm. Onto the obtained adhesive resin layer was laminated a 50 μm-thick unstretched polypropylene (PP) film "TOREFAN NO ZK-93K" produced by Toray Synthetic Film Co., Ltd., thereby obtaining a transparent laminated film having a layer structure composed of the PET film, the inorganic thin film layer, the coating layer, the printed layer, the adhesive resin layer and the PP film. The obtained laminated film was aged at 40° C. for 3 days to obtain a film to be evaluated. Then, the resultant film was tested to evaluate an oxygen permeability thereof and an adhesion strength between the respective layers. Further, the film was subjected to hydrothermal treatment in an autoclave at 120° C. for 30 min to measure an oxygen permeability and an adhesion strength thereof before and after the hydrothermal treatment. The results are shown in Table 5.

Example 2

The same procedure as defined in Example 1 was conducted except that the transparent laminated film was heat-treated in an oven at 150° C. for 30 min in place of aging, thereby obtaining a film to be evaluated. The obtained film was subjected to the same hydrothermal treatment as conducted in Example 1 to measure an oxygen permeability and an adhesion strength thereof before and after the hydrothermal treatment. The results are shown in Table 5.

Examples 3 to 15

The same procedure as defined in Example 1 was conducted except that properties of resin constituting the coating material, amount of the resin blended, and additives were varied as shown in Tables 1 and 2, thereby obtaining films to be evaluated. Meanwhile, in Example 10, there was used neither silane coupling agent, fatty amide-based compound nor polyisocyanate. The obtained films were subjected to the same hydrothermal treatment as conducted in Example 1 to measure an oxygen permeability and an adhesion strength thereof before and after the hydrothermal treatment. The results are shown in Table 5.

Example 16

A coating material was applied onto the silicon oxide thin film formed on the silicon oxide-deposited nylon film, and then dried at 100° C. for 60 s to form a 0.5 μm-thick coating layer thereon. The coating material was composed of 10 parts by weight of a polyester resin having a glass transition temperature of 60° C., a molecular weight of 8000 and an acid value of 23 mgKOH/g, 10 parts by weight of a polyurethane resin having a glass transition temperature of 82° C., a molecular weight of 15000 and an acid value of 18 mgKOH/g, 1 part by weight of γ-glycidoxypropyl trimethoxysilane as a silane coupling agent, 1 part by weight of stearamide as a fatty amide-based compound, 39 parts by weight of toluene and 39 parts by weight of methyl ethyl ketone (MEK), and further contained a polyisocyanate "CORONATE L" produced by Nippon Polyurethane Industry Co., Ltd., in an amount of 1.2 times a total hydroxyl equivalent of the polyester resin and the polyurethane resin (refer to Tables 1 and 2). As a result, it was confirmed that the obtained silicon oxide-deposited nylon film had an oxygen permeability of 9 fmol/m$^2$/s/Pa.

Using a gravure printing ink, printing patterns composed of 5 colors including black, indigo blue, red, yellow and white were formed on the coating layer of the silicon oxide-deposited nylon film to evaluate a transfer property of the printing patterns.

Further, a urethane-based adhesive (mixture containing adhesives "AD-900" and "CAT-RT85" both produced by Toyo Morton Co., Ltd., at a blending ratio of 10:1.5) was applied onto the surface of the printed layer formed on the silicon oxide-deposited nylon film, and then dried, thereby forming an adhesive resin layer having a thickness of 4 μm. Onto the obtained adhesive resin layer was laminated a 50 μm-thick unstretched polypropylene (PP) film "TOREFAN NO ZK-93K" produced by Toray Synthetic Film Co., Ltd., thereby obtaining a transparent laminated film having a layer structure composed of the nylon film, the inorganic thin film layer, the coating layer, the printed layer, the adhesive resin layer and the PP film. The obtained laminated film was aged at 40° C. for 3 days to obtain a film to be evaluated. Then, the resultant film was tested to evaluate an oxygen permeability thereof and an adhesion strength between the respective layers. Further, the film was subjected to hydrothermal treatment in an autoclave at 120° C. for 30 min to measure an oxygen permeability and an adhesion strength thereof before and after the hydrothermal treatment. The results are shown in Table 5.

Example 17

The same procedure as defined in Example 16 was conducted except that properties of resin constituting the coating material, amount of the resin blended, and additives were varied as shown in Tables 1 and 2, thereby obtaining a film to be evaluated. The obtained film was subjected to the same hydrothermal treatment as conducted in Example 16 to measure an oxygen permeability and an adhesion strength thereof before and after the hydrothermal treatment. The results are shown in Table 5.

Example 18

A coating material was applied onto the silicon oxide thin film formed on the silicon oxide-deposited PET film, and then dried at 100° C. for 60 s to form a 0.5 μm-thick coating layer thereon. The coating material was composed of 10 parts by weight of a polyester resin having a glass transition temperature of 60° C., a molecular weight of 8000 and an acid value of 23 mgKOH/g, 10 parts by weight of a polyurethane resin having a glass transition temperature of 82° C., a molecular weight of 15000 and an acid value of 18 mgKOH/g, 1 part by weight of γ-glycidoxypropyl trimethoxysilane as a silane coupling agent, 1 part by weight of stearamide as a fatty amide-based compound, 39 parts by weight of toluene and 39 parts by weight of methyl ethyl ketone (MEK), and further contained a polyisocyanate "CORONATE L" produced by Nippon Polyurethane Industry Co., Ltd., in an amount of 1.2 times a total hydroxyl equivalent of the polyester resin and the polyurethane resin (refer to Tables 1 and 2). As a result, it was confirmed that the obtained silicon oxide-deposited PET film had an oxygen permeability of 9 fmol/m$^2$/s/Pa.

Using a gravure printing ink, printing patterns composed of 5 colors including black, indigo blue, red, yellow and white were formed on the coating layer of the silicon oxide-deposited PET film to evaluate a transfer property of the printing patterns.

Further, a urethane-based adhesive (mixture containing adhesives "AD-900" and "CAT-RT85" both produced by Toyo Morton Co., Ltd., at a blending ratio of 10:1.5) was applied onto the surface of the printed layer formed on the silicon oxide-deposited PET film, and then dried, thereby forming an adhesive resin layer having a thickness of 4 μm. Onto the obtained adhesive resin layer was laminated a 15 μm-thick biaxially stretched nylon film "SANTONEAL SNR" produced by Mitsubishi Plastics, Inc. Further, a urethane-based adhesive (mixture containing adhesives "AD-900" and "CAT-RT85" both produced by Toyo Morton Co., Ltd., at a blending ratio of 10:1.5) was applied onto the biaxially stretched nylon film, and then dried, thereby forming an adhesive resin layer having a thickness of 4 μm. Onto the obtained adhesive resin layer was laminated a 50 μm-thick unstretched polypropylene (PP) film "TOREFAN NO ZK-93K" produced by Toray Synthetic Film Co., Ltd., thereby obtaining a transparent laminated film having a layer structure composed of the PET film, the inorganic thin film layer, the coating layer, the printed layer, the adhesive resin layer, the nylon film, the adhesive resin layer and the PP film. The obtained laminated film was aged at 40° C. for 3 days to obtain a film to be evaluated. Then, the resultant film was tested to evaluate an oxygen permeability thereof and an adhesion strength between the respective layers. Further, the film was subjected to hydrothermal treatment in an autoclave at 120° C. for 30 min to measure an oxygen permeability and an adhesion strength thereof before and after the hydrothermal treatment. The results are shown in Table 5.

Example 19

The same procedure as defined in Example 18 was conducted except that properties of resin constituting the coating material, amount of the resin blended, and additives were varied as shown in Tables 1 and 2, thereby obtaining a film to be evaluated. The obtained film was subjected to the same hydrothermal treatment as conducted in Example 18 to measure an oxygen permeability and an adhesion strength thereof before and after the hydrothermal treatment. The results are shown in Table 5.

Example 20

The same procedure as defined in Example 6 was conducted except that the aluminum oxide-deposited PET film was used in place of the silicon oxide-deposited PET film, thereby obtaining a film to be evaluated. The obtained film was subjected to the same hydrothermal treatment as conducted in Example 6 to measure an oxygen permeability and an adhesion strength thereof before and after the hydrothermal treatment. The results are shown in Table 5.

Example 21

The same procedure as defined in Example 20 was conducted except that properties of resin constituting the coating material, amount of the resin blended, and additives were varied as shown in Tables 1 and 2, thereby obtaining a film to be evaluated. The obtained film was subjected to the same hydrothermal treatment as conducted in Example 20 to measure an oxygen permeability and an adhesion strength thereof before and after the hydrothermal treatment. The results are shown in Table 5.

Reference Example 1

The same procedure as defined in Example 1 was conducted except that no coating layer was formed, thereby obtaining a film to be evaluated. The obtained film was subjected to the same hydrothermal treatment as conducted in Example 1 to measure an oxygen permeability and an adhesion strength thereof before and after the hydrothermal treatment. The results are shown in Table 6.

Reference Examples 2 to 9

The same procedure as defined in Example 1 was conducted except that properties of resin constituting the coating material, amount of the resin blended, and additives were varied as shown in Tables 3 and 4, thereby obtaining films to be evaluated. The obtained films were subjected to the same hydrothermal treatment as conducted in Example 1 to measure an oxygen permeability and an adhesion strength thereof before and after the hydrothermal treatment. The results are shown in Table 6.

Reference Examples 10 and 11

The same procedure as defined in Example 16 was conducted except that properties of resin constituting the coating material, amount of the resin blended, and additives were varied as shown in Tables 3 and 4, thereby obtaining films to be evaluated. The obtained films were subjected to the same hydrothermal treatment as conducted in Example 16 to measure an oxygen permeability and an adhesion strength thereof before and after the hydrothermal treatment. The results are shown in Table 6.

TABLE 1

| Examples | Plastic substrate (A) | Inorganic thin film (B) | Coating layer (C) Polyester-based resin (c1) | | |
|---|---|---|---|---|---|
| | | | Tg (° C.) | Molecular weight | Acid value (mgKOH/g) |
| Example 1 | PET | SiO$x$ | 57 | 3000 | 42 |
| Example 2 | PET | SiO$x$ | 57 | 3000 | 42 |
| Example 3 | PET | SiO$x$ | 60 | 8000 | 23 |
| Example 4 | PET | SiO$x$ | 66 | 15000 | 10 |
| Example 5 | PET | SiO$x$ | 57 | 3000 | 42 |
| Example 6 | PET | SiO$x$ | 60 | 8000 | 23 |
| Example 7 | PET | SiO$x$ | 60 | 8000 | 23 |
| Example 8 | PET | SiO$x$ | 60 | 8000 | 23 |
| Example 9 | PET | SiO$x$ | 65 | 15000 | 10 |
| Example 10 | PET | SiO$x$ | 65 | 15000 | 10 |
| Example 11 | PET | SiO$x$ | 57 | 3000 | 42 |
| Example 12 | PET | SiO$x$ | 57 | 3000 | 42 |
| Example 13 | PET | SiO$x$ | 57 | 3000 | 42 |
| Example 14 | PET | SiO$x$ | 60 | 8000 | 23 |
| Example 15 | PET | SiO$x$ | 65 | 15000 | 10 |
| Example 16 | Nylon | SiO$x$ | 60 | 8000 | 23 |
| Example 17 | Nylon | SiO$x$ | 57 | 3000 | 42 |
| Example 18 | PET | SiO$x$ | 60 | 8000 | 23 |
| Example 19 | PET | SiO$x$ | 57 | 3000 | 42 |
| Example 20 | PET | Aluminum oxide | 60 | 8000 | 23 |
| Example 21 | PET | Aluminum oxide | 67 | 3000 | 42 |

TABLE 1-continued

| Examples | Coating layer (C) Polyurethane-based resin (c2) | | | Blending ratio c1/c2 |
|---|---|---|---|---|
| | Tg (° C.) | Molecular weight | Acid value (mgKOH/g) | |
| Example 1 | 75 | 8000 | 20 | 50/50 |
| Example 2 | 75 | 8000 | 20 | 50/50 |
| Example 3 | 75 | 8000 | 20 | 50/50 |
| Example 4 | 75 | 8000 | 20 | 50/50 |
| Example 5 | 82 | 15000 | 18 | 50/50 |
| Example 6 | 82 | 15000 | 18 | 50/50 |
| Example 7 | 82 | 15000 | 18 | 10/90 |
| Example 8 | 82 | 15000 | 18 | 90/10 |
| Example 9 | 82 | 15000 | 18 | 50/50 |
| Example 10 | 82 | 15000 | 18 | 50/50 |
| Example 11 | 85 | 30000 | 15 | 50/50 |
| Example 12 | 85 | 30000 | 15 | 10/90 |
| Example 13 | 85 | 30000 | 15 | 90/10 |
| Example 14 | 85 | 30000 | 15 | 50/50 |
| Example 15 | 85 | 30000 | 15 | 50/50 |
| Example 16 | 82 | 15000 | 18 | 50/50 |
| Example 17 | 85 | 30000 | 15 | 50/50 |
| Example 18 | 82 | 15000 | 18 | 50/50 |
| Example 19 | 85 | 30000 | 15 | 50/50 |
| Example 20 | 82 | 15000 | 18 | 50/50 |
| Example 21 | 85 | 30000 | 15 | 50/50 |

TABLE 2

| Examples | Additives for coating layer (C) | | |
|---|---|---|---|
| | Silane coupling agent[1] | Fatty amide-based compound[2] | Polyisocyanate |
| Example 1 | GPMS | SA | COLONATE L |
| Example 2 | GPMS | SA | COLONATE L |
| Example 3 | GPMS | SA | COLONATE L |
| Example 4 | GPMS | SA | COLONATE L |
| Example 5 | GPMS | SA | COLONATE L |
| Example 6 | GPMS | SA | COLONATE L |
| Example 7 | GPMS | SA | COLONATE L |
| Example 8 | GPMS | SA | COLONATE L |
| Example 9 | GPMS | SA | COLONATE L |
| Example 10 | None | None | None |
| Example 11 | GPMS | SA | COLONATE L |
| Example 12 | GPMS | SA | COLONATE L |
| Example 13 | GPMS | SA | COLONATE L |
| Example 14 | GPMS | SA | COLONATE L |
| Example 15 | GPMS | SA | COLONATE L |
| Example 16 | GPMS | SA | COLONATE L |
| Example 17 | GPMS | SA | COLONATE L |
| Example 18 | GPMS | SA | COLONATE L |
| Example 19 | GPMS | SA | COLONATE L |
| Example 20 | GPMS | SA | COLONATE L |
| Example 21 | GPMS | SA | COLONATE L |

| Examples | Heat treatment | Layer structure |
|---|---|---|
| Example 1 | None | PET/SiO$x$/CL[3]/PL[4]/PP |
| Example 2 | Done | PET/SiO$x$/CL[3]/PL[4]/PP |
| Example 3 | None | PET/SiO$x$/CL[3]/PL[4]/PP |
| Example 4 | None | PET/SiO$x$/CL[3]/PL[4]/PP |
| Example 5 | None | PET/SiO$x$/CL[3]/PL[4]/PP |
| Example 6 | None | PET/SiO$x$/CL[3]/PL[4]/PP |
| Example 7 | None | PET/SiO$x$/CL[3]/PL[4]/PP |
| Example 8 | None | PET/SiO$x$/CL[3]/PL[4]/PP |
| Example 9 | None | PET/SiO$x$/CL[3]/PL[4]/PP |
| Example 10 | None | PET/SiO$x$/CL[3]/PL[4]/PP |
| Example 11 | None | PET/SiO$x$/CL[3]/PL[4]/PP |
| Example 12 | None | PET/SiO$x$/CL[3]/PL[4]/PP |
| Example 13 | None | PET/SiO$x$/CL[3]/PL[4]/PP |
| Example 14 | None | PET/SiO$x$/CL[3]/PL[4]/PP |
| Example 15 | None | PET/SiO$x$/CL[3]/PL[4]/PP |

TABLE 2-continued

| | | |
|---|---|---|
| Example 16 | None | Nylon/SiOx/CL[3]/PL[4]/PP |
| Example 17 | None | Nylon/SiOx/CL[3]/PL[4]/PP |
| Example 18 | None | PET/SiOx/CL[3]/PL[4]/Nylon/PP |
| Example 19 | None | PET/SiOx/CL[3]/PL[4]/Nylon/PP |
| Example 20 | None | PET/Al$_2$O$_3$/CL[3]/PL[4]/PP |
| Example 21 | None | PET/Al$_2$O$_3$/CL[3]/PL[4]/PP |

Note:
[1] GMPS: γ-glycidoxypropyl trimethoxysilane;
[2] SA: stearamide
[3] CL: Coating layer;
[4] PL: Printed layer

TABLE 3

| Reference Examples | Plastic substrate (A) | Inorganic thin film (B) | Coating layer (C) Polyester-based resin (c1) | | |
|---|---|---|---|---|---|
| | | | Tg (°C.) | Molecular weight | Acid value (mgKOH/g) |
| Reference Example 1 | PET | SiOx | — | — | — |
| Reference Example 2 | PET | SiOx | — | — | — |
| Reference Example 3 | PET | SiOx | — | — | — |
| Reference Example 4 | PET | SiOx | — | — | — |
| Reference Example 5 | PET | SiOx | 57 | 3000 | 42 |
| Reference Example 6 | PET | SiOx | 60 | 8000 | 23 |
| Reference Example 7 | PET | SiOx | 65 | 15000 | 10 |
| Reference Example 8 | PET | SiOx | 60 | 8000 | 23 |
| Reference Example 9 | PET | SiOx | 55 | 1500 | 47 |
| Reference Example 10 | Nylon | SiOx | — | — | — |
| Reference Example 11 | Nylon | SiOx | 60 | 8000 | 23 |

| Reference Examples | Coating layer (C) Polyurethane-based resin (c2) | | | Blending ratio c1/c2 |
|---|---|---|---|---|
| | Tg (°C.) | Molecular weight | Acid value (mgKOH/g) | |
| Reference Example 1 | — | — | — | — |
| Reference Example 2 | 75 | 8000 | 20 | 0/100 |
| Reference Example 3 | 82 | 15000 | 18 | 0/100 |
| Reference Example 4 | 85 | 30000 | 15 | 0/100 |
| Reference Example 5 | — | — | — | 100/0 |
| Reference Example 6 | — | — | — | 100/0 |
| Reference Example 7 | — | — | — | 100/0 |
| Reference Example 8 | 58 | 3000 | 34 | 50/50 |
| Reference Example 9 | 82 | 15000 | 18 | 50/50 |
| Reference Example 10 | 82 | 15000 | 18 | 0/100 |
| Reference Example 11 | — | — | — | 100/0 |

TABLE 4

| Reference Examples | Additives for coating layer (C) | | |
|---|---|---|---|
| | Silane coupling agent[1] | Fatty amide-based compound[2] | Polyisocyanate |
| Reference Example 1 | None | None | None |
| Reference Example 2 | GPMS | SA | COLONATE L |
| Reference Example 3 | GPMS | SA | COLONATE L |
| Reference Example 4 | GPMS | SA | COLONATE L |
| Reference Example 5 | GPMS | SA | COLONATE L |
| Reference Example 6 | GPMS | SA | COLONATE L |
| Reference Example 7 | GPMS | SA | COLONATE L |
| Reference Example 8 | GPMS | SA | COLONATE L |
| Reference Example 9 | GPMS | SA | COLONATE L |
| Reference Example 10 | GPMS | SA | COLONATE L |
| Reference Example 11 | GPMS | SA | COLONATE L |

| Reference Examples | Heat treatment | Layer structure |
|---|---|---|
| Reference Example 1 | None | PET/SiOx/CL[3]/PL[4]/PP |
| Reference Example 2 | None | PET/SiOx/CL[3]/PL[4]/PP |
| Reference Example 3 | None | PET/SiOx/CL[3]/PL[4]/PP |
| Reference Example 4 | None | PET/SiOx/CL[3]/PL[4]/PP |
| Reference Example 5 | None | PET/SiOx/CL[3]/PL[4]/PP |
| Reference Example 6 | None | PET/SiOx/CL[3]/PL[4]/PP |
| Reference Example 7 | None | PET/SiOx/CL[3]/PL[4]/PP |
| Reference Example 8 | None | PET/SiOx/CL[3]/PL[4]/PP |
| Reference Example 9 | None | PET/SiOx/CL[3]/PL[4]/PP |
| Reference Example 10 | None | Nylon/SiOx/CL[3]/PL[4]/PP |
| Reference Example 11 | None | Nylon/SiOx/CL[3]/PL[4]/PP |

Note:
[1] GMPS: γ-glycidoxypropyl trimethoxysilane;
[2] SA: stearamide
[3] CL: Coating layer;
[4] PL: Printed layer

TABLE 5

| Examples | Oxygen permeability | | Adhesion strength | | Gradation printability |
|---|---|---|---|---|---|
| | Before hydro-thermal treatment | After hydro-thermal treatment | Before hydro-thermal treatment | After hydro-thermal treatment | |
| Example 1 | A | C | A | A | A |
| Example 2 | A | B | A | A | A |
| Example 3 | A | B | A | A | A |
| Example 4 | A | B | A | A | A |
| Example 5 | A | B | A | A | A |
| Example 6 | A | A | A | A | A |
| Example 7 | A | B | B | C | B |

TABLE 5-continued

| | Oxygen permeability | | Adhesion strength | | |
| --- | --- | --- | --- | --- | --- |
| Examples | Before hydro-thermal treatment | After hydro-thermal treatment | Before hydro-thermal treatment | After hydro-thermal treatment | Gradation printability |
| Example 8 | B | C | A | B | A |
| Example 9 | A | A | A | A | A |
| Example 10 | A | B | A | B | A |
| Example 11 | A | A | A | A | A |
| Example 12 | A | B | B | C | A |
| Example 13 | B | C | A | B | A |
| Example 14 | A | B | A | A | B |
| Example 15 | A | B | A | A | B |
| Example 16 | A | C | A | A | A |
| Example 17 | A | C | A | A | A |
| Example 18 | A | B | A | A | A |
| Example 19 | A | B | A | A | A |
| Example 20 | A | A | A | A | A |
| Example 21 | A | A | A | A | A |

TABLE 6

| | Oxygen permeability | | Adhesion strength | | |
| --- | --- | --- | --- | --- | --- |
| Reference Examples | Before hydro-thermal treatment | After hydro-thermal treatment | Before hydro-thermal treatment | After hydro-thermal treatment | Gradation printability |
| Reference Example 1 | D | D | D | D | B |
| Reference Example 2 | D | D | C | C | C |
| Reference Example 3 | C | D | B | C | D |
| Reference Example 4 | D | D | C | C | D |
| Reference Example 5 | C | D | C | D | C |
| Reference Example 6 | C | C | B | C | D |
| Reference Example 7 | C | D | C | D | D |
| Reference Example 8 | C | D | B | C | C |
| Reference Example 9 | C | D | B | C | C |
| Reference Example 10 | D | D | C | D | D |
| Reference Example 11 | D | D | C | D | D |

Example 22

A coating material was applied onto the silicon oxide thin film formed on the silicon oxide-deposited PET film, and then dried at 100° C. for 60 s to form a 0.5 μm-thick coating layer thereon. The coating material was composed of 10 parts by weight of a polyester resin having a glass transition temperature of 60° C., a molecular weight of 8000 and an acid value of 23 mgKOH/g, 10 parts by weight of a polyurethane resin having a glass transition temperature of 75° C., a molecular weight of 8000 and an acid value of 20 mgKOH/g, 1 part by weight of γ-glycidoxypropyl trimethoxysilane as a silane coupling agent, 1 part by weight of stearamide as a fatty amide-based compound, 39 parts by weight of toluene and 39 parts by weight of methyl ethyl ketone (MEK), and further contained a polyisocyanate "CORONATE L" produced by Nippon Polyurethane Co., Ltd., in an amount of 1.2 times a total hydroxyl equivalent of the polyester resin and the polyurethane resin. As a result, it was confirmed that the obtained silicon oxide-deposited PET film had an oxygen permeability of 6 fmol/m²/s/Pa.

Using a gravure printing ink, printing patterns composed of 5 colors including black, indigo blue, red, yellow and white were formed on the coating layer of the silicon oxide-deposited PET film to evaluate a transfer property of the printing patterns.

Further, a urethane-based adhesive (mixture containing adhesives "AD-900" and "CAT-RT85" both produced by Toyo Morton Co., Ltd., at a blending ratio of 10:1.5) was applied onto the surface of the printed layer formed on the silicon oxide-deposited PET film, and then dried, thereby forming an adhesive resin layer having a thickness of 4 μm. Onto the obtained adhesive resin layer was laminated a 50 μm-thick unstretched polypropylene (PP) film "TOREFAN NO ZK-93K" produced by Toray Synthetic Film Co., Ltd., thereby obtaining a transparent laminated film having a layer structure composed of the PET film, the inorganic thin film layer, the coating layer, the printed layer, the adhesive resin layer and the PP film. The obtained laminated film was aged at 40° C. for 3 days to obtain a film to be evaluated. Then, the resultant film was tested to evaluate an oxygen permeability thereof and an adhesion strength between the respective layers. Further, the film was subjected to hydrothermal treatment in an autoclave at 120° C. for 30 min to measure an oxygen permeability and an adhesion strength thereof before and after the hydrothermal treatment. The results are shown in Table 7.

Example 23

The same procedure as defined in Example 22 was conducted except that the polyester resin used in the coating material was replaced with a polyester resin having a glass transition temperature of 65° C., a molecular weight of 15000 and an acid value of 10 mgKOH/g, thereby obtaining a film to be evaluated. The obtained film was subjected to the same hydrothermal treatment as conducted in Example 22 to measure an oxygen permeability and an adhesion strength thereof before and after the hydrothermal treatment. The results are shown in Table 7.

Example 24

The same procedure as defined in Example 22 was conducted except that the polyester resin used in the coating material was replaced with a polyester resin having a glass transition temperature of 85° C., a molecular weight of 30000 and an acid value of 15 mgKOH/g, and the polyurethane resin used in the coating material was replaced with a polyurethane resin having a glass transition temperature of 57° C., a molecular weight of 3000 and an acid value of 42 mgKOH/g, thereby obtaining a film to be evaluated. The obtained film was subjected to the same hydrothermal treatment as conducted in Example 22 to measure an oxygen permeability and an adhesion strength thereof before and after the hydrothermal treatment. The results are shown in Table 7.

Example 25

The same procedure as defined in Example 22 was conducted except that the polyester resin used in the coating material was replaced with a polyester resin having a glass transition temperature of 85° C., a molecular weight of 30000 and an acid value of 15 mgKOH/g, and the polyurethane resin used in the coating material was replaced with a urethane resin having a glass transition temperature of 65° C., a molecular weight of 15000 and an acid value of 10 mgKOH/g, thereby obtaining a film to be evaluated. The obtained film was subjected to the same hydrothermal treatment as conducted in Example 22 to measure an oxygen permeability and an adhesion strength thereof before and after the hydrothermal treatment. The results are shown in Table 7.

Example 26

The same procedure as defined in Example 22 was conducted except that the thickness of the coating layer was changed to 0.1 μm, thereby obtaining a film to be evaluated. The obtained film was subjected to the same hydrothermal treatment as conducted in Example 22 to measure an oxygen permeability and an adhesion strength thereof before and after the hydrothermal treatment. The results are shown in Table 8.

Example 27

The same procedure as defined in Example 22 was conducted except that the thickness of the coating layer was changed to 3 μm, thereby obtaining a film to be evaluated. The obtained film was subjected to the same hydrothermal treatment as conducted in Example 22 to measure an oxygen permeability and an adhesion strength thereof before and after the hydrothermal treatment. The results are shown in Table 8.

Example 28

A urethane-based adhesive (mixture containing adhesives "AD-900" and "CAT-RT85" both produced by Toyo Morton Co., Ltd., at a blending ratio of 10:1.5) was applied onto the surface of the printed layer formed on the film obtained in Example 22 which had a layer structure composed of the PET film, the inorganic thin film layer, the coating layer and the printed layer, and then dried, thereby forming an adhesive resin layer having a thickness of 4 μm. Onto the obtained adhesive resin layer was laminated a 15 μm-thick biaxially stretched nylon film "SANTONEAL SNR" produced by Mitsubishi Plastics, Inc. Further, a urethane-based adhesive (mixture containing adhesives "AD-900" and "CAT-RT85" both produced by Toyo Morton Co., Ltd., at a blending ratio of 10:1.5) was applied onto the biaxially stretched nylon film, and then dried, thereby forming an adhesive resin layer having a thickness of 4 μm. Onto the obtained adhesive resin layer was laminated a 50 μm-thick unstretched polypropylene (PP) film "TOREFAN NO ZK-93K" produced by Toray Synthetic Film Co., Ltd., thereby obtaining a transparent laminated film having a layer structure composed of the PET film, the inorganic thin film layer, the coating layer, the printed layer, the adhesive resin layer, the nylon film, the adhesive resin layer and the PP film. The obtained laminated film was aged at 40° C. for 3 days to obtain a film to be evaluated. Then, the resultant film was tested to evaluate an oxygen permeability thereof and an adhesion strength between the respective layers. Further, the film was subjected to hydrothermal treatment in an autoclave at 120° C. for 30 min to measure an oxygen permeability and an adhesion strength thereof before and after the hydrothermal treatment. The results are shown in Table 8.

Example 29

The same procedure as defined in Example 22 was conducted except that the silicon oxide-deposited PET film was heat-treated in an oven at 150° C. for 30 min, thereby obtaining a film to be evaluated. The obtained film was subjected to the same hydrothermal treatment as conducted in Example 22 to measure an oxygen permeability and an adhesion strength thereof before and after the hydrothermal treatment. The results are shown in Table 8.

Example 30

The same procedure as defined in Example 22 was conducted except that the aluminum oxide-deposited PET film was used in place of the silicon oxide-deposited PET film, thereby obtaining a film to be evaluated. The obtained film was subjected to the same hydrothermal treatment as conducted in Example 22 to measure an oxygen permeability and an adhesion strength thereof before and after the hydrothermal treatment. The results are shown in Table 9.

Example 31

The same procedure as defined in Example 22 was conducted except that the plastic substrate was changed to a 15 μm-thick biaxially stretched nylon film "SANTONEAL SNR (ONY)" produced by Mitsubishi Plastics, Inc., thereby obtaining a film to be evaluated. The obtained film was subjected to the same hydrothermal treatment as conducted in Example 22 to measure an oxygen permeability and an adhesion strength thereof before and after the hydrothermal treatment. The results are shown in Table 9.

Example 32

The same procedure as defined in the above "Production of vapor-deposited PET film" was conducted except that the mixed resin forming the anchor coat layer of the silicon oxide-deposited PET film was changed to a mixed resin composed of 40% by weight of the coating resin A (acrylic resin), 40% by weight of the coating resin B (polyurethane resin) and 20% by weight of an oxazoline group-containing polymer "EPOCROSS WS-500" produced by Nippon Shokubai Co., Ltd., thereby obtaining a silicon oxide-deposited PET film. The obtained silicon oxide-deposited PET film was subjected to the same procedure as defined in Example 22, thereby obtaining a film to be evaluated. The obtained film was further subjected to the same hydrothermal treatment as conducted in Example 22 to measure an oxygen permeability and an adhesion strength thereof before and after the hydrothermal treatment. The results are shown in Table 9.

Example 33

The same procedure as defined in Example 22 was conducted except that the silicon oxide-deposited PET film obtained in Example 32 was used, thereby obtaining a film having a layer structure composed of the PET film, the inorganic thin film layer, the coating layer and the printed layer. A urethane-based adhesive (mixture containing adhesives "AD-900" and "CAT-RT85" both produced by Toyo Morton Co., Ltd., at a blending ratio of 10:1.5) was applied onto the surface of the printed layer formed on the obtained film, and then dried, thereby forming an adhesive resin layer having a thickness of 4 μm. Onto the obtained adhesive resin was laminated a 15 μm-thick biaxially stretched nylon film "SANTONEAL SNR" produced by Mitsubishi Plastics, Inc. Further, a urethane-based adhesive (mixture containing adhesives "AD-900" and "CAT-RT85" both produced by Toyo Morton Co., Ltd., at a blending ratio of 10:1.5) was applied onto the biaxially stretched nylon film, and then dried, thereby forming an adhesive resin layer having a thickness of 4 μm. Onto the obtained adhesive resin layer was laminated a 50 μm-thick unstretched polypropylene (PP) film "TORE-FAN NO ZK-93K" produced by Toray Synthetic Film Co., Ltd., thereby obtaining a transparent laminated film having a layer structure composed of the PET film, the inorganic thin film layer, the coating layer, the printed layer, the adhesive resin layer, the nylon film, the adhesive resin layer and the PP film. The obtained laminated film was heat-treated in an oven at 150° C. for 30 min to obtain a film to be evaluated. Then, the resultant film was tested to evaluate an oxygen permeability thereof and an adhesion strength between the respective layers. Further, the film was subjected to hydrothermal treatment in an autoclave at 120° C. for 30 min to measure an oxygen permeability and an adhesion strength thereof before and after the hydrothermal treatment. The results are shown in Table 9.

Example 34

The same procedure as defined in Example 22 was conducted except that a hydrolyzed mixed coating material composed of 100 parts by weight of the coating resin C (alkoxysilyl group-containing polyurethane resin) and 2 parts by weight of a methoxysilane partial condensate "MS51" produced by Mitsubishi Chemical Corporation, was used as the coating material, thereby obtaining a film to be evaluated. The obtained film was subjected to the same hydrothermal treatment as conducted in Example 22 to measure an oxygen permeability and an adhesion strength thereof before and after the hydrothermal treatment. The results are shown in Table 10.

Reference Example 12

The same procedure as defined in Example 22 was conducted except that 20 parts by weight of scale-like silica having an average particle diameter of 0.5 μm was added to 100 parts by weight of the coating material, thereby obtaining a film to be evaluated. The obtained film was subjected to the same hydrothermal treatment as conducted in Example 22 to measure an oxygen permeability and an adhesion strength thereof before and after the hydrothermal treatment. The results are shown in Table 10.

Reference Example 13

The same procedure as defined in Example 32 was conducted except that 50 parts by weight of silica sol having an average particle diameter of 10 nm was added to 100 parts by weight of the coating material, thereby obtaining a film to be evaluated. The obtained film was subjected to the same hydrothermal treatment as conducted in Example 22 to measure an oxygen permeability and an adhesion strength thereof before and after the hydrothermal treatment. The results are shown in Table 10.

Reference Example 14

The same procedure as defined in Example 22 was conducted except that the polyester resin used in the coating material was replaced with a polyester resin having a glass transition temperature of 57° C., a molecular weight of 3000 and an acid value of 42 mgKOH/g, thereby obtaining a film to be evaluated. The obtained film was subjected to the same hydrothermal treatment as conducted in Example 22 to measure an oxygen permeability and an adhesion strength thereof before and after the hydrothermal treatment. The results are shown in Table 10.

Reference Example 15

The same procedure as defined in Example 22 was conducted except that the polyester resin used in the coating material was replaced with a polyester resin having a glass transition temperature of 82° C., a molecular weight of 15000 and an acid value of 18 mgKOH/g, thereby obtaining a film to be evaluated. The obtained film was subjected to the same hydrothermal treatment as conducted in Example 22 to measure an oxygen permeability and an adhesion strength thereof before and after the hydrothermal treatment. The results are shown in Table 11.

Reference Example 16

The same procedure as defined in Example 22 was conducted except that a coating material composed of 85 parts by weight of a urethane resin and 15 parts by weight of an oxazoline resin was used, thereby obtaining a film to be evaluated. The obtained film was subjected to the same hydrothermal treatment as conducted in Example 22 to measure an oxygen permeability and an adhesion strength thereof before and after the hydrothermal treatment. The results are shown in Table 11.

Reference Example 17

The same procedure as defined in Example 22 was conducted except that no coating layer was formed, thereby obtaining a film to be evaluated. The obtained film was subjected to the same hydrothermal treatment as conducted in Example 22 to measure an oxygen permeability and an adhesion strength thereof before and after the hydrothermal treatment. The results are shown in Table 11.

TABLE 7

| | Examples | | | |
|---|---|---|---|---|
| | 22 | 23 | 24 | 25 |
| Construction of gas-barrier laminate | | | | |
| Substrate | PET | PET | PET | PET |
| Inorganic thin film | SiOx | SiOx | SiOx | SiOx |
| Coating layer (kind of resin; molecular weight) | UT[5] (15000) PE[6] (8000) | UT[5] (15000) PE[6] (15000) | UT[5] (30000) PE[6] (3000) | UT[5] (30000) PE[6] (15000) |
| Thickness of coating layer (μm) | 0.5 | 0.5 | 0.5 | 0.5 |
| Layer structure of laminate | PET/ SiOx/ PL[7]/PP | PET/ SiOx/ PL[7]/PP | PET/ SiOx/ PL[7]/PP | PET/ SiOx/ PL[7]/PP |
| Use or non-use of heat treatment | None | None | None | None |
| Properties of gas-barrier laminate | | | | |
| Hardness of coating layer in air (GPa) | 0.22 | 0.21 | 0.23 | 0.25 |
| Hardness of coating layer in water (GPa) | 0.16 | 0.16 | 0.18 | 0.18 |
| Ratio of number of carbon atoms derived from carboxyl groups to number of carbon atoms constituting surface of coating layer | 0.008 | 0.01 | 0.013 | 0.016 |

TABLE 7-continued

|  | Examples | | | |
| --- | --- | --- | --- | --- |
|  | 22 | 23 | 24 | 25 |
| Oxygen permeability before hydrothermal treatment (printed portion) (fmol/m$^2$/s/Pa) | A | A | A | A |
| Oxygen permeability after hydrothermal treatment (non-printed portion) (fmol/m$^2$/s/Pa) | A | A | B | B |
| Oxygen permeability after hydrothermal treatment (printed portion) (fmol/m$^2$/s/Pa) | A | A | B | B |
| Adhesion property after hydrothermal treatment | A | A | C | C |
| Gradation printability | A | A | A | A |

Note:
[5] UT: Urethane;
[6] PE: Polyester;
[7] PL: Printed layer

TABLE 8

|  | Examples | | | |
| --- | --- | --- | --- | --- |
|  | 26 | 27 | 28 | 29 |
| Construction of gas-barrier laminate | | | | |
| Substrate | PET | PET | PET | PET |
| Inorganic thin film | SiOx | SiOx | SiOx | SiOx |
| Coating layer (kind of resin; molecular weight) | UT[5] (15000) PE[6] (15000) | UT[5] (15000) PE[6] (15000) | UT[5] (15000) PE[6] (15000) | UT[5] (15000) PE[6] (15000) |

TABLE 8-continued

|  | Examples | | | |
| --- | --- | --- | --- | --- |
|  | 26 | 27 | 28 | 29 |
| Thickness of coating layer (μm) | 0.1 | 3 | 0.5 | 0.5 |
| Layer structure of laminate | PET/ SiOx/ PL[7]/PP | PET/ SiOx/ PL[7]/PP | PET/ SiOx/ PL[7]/ ONY/PP | PET/ SiOx/ PL[7]/ ONY/PP |
| Use or non-use of heat treatment | None | None | None | 150° C. 30 min |
| Properties of gas-barrier laminate | | | | |
| Hardness of coating layer in air (GPa) | 0.22 | 0.20 | 0.21 | 0.21 |
| Hardness of coating layer in water (GPa) | 0.17 | 0.15 | 0.16 | 0.16 |
| Ratio of number of carbon atoms derived from carboxyl groups to number of carbon atoms constituting surface of coating layer | 0.01 | 0.01 | 0.01 | 0.01 |
| Oxygen permeability before hydrothermal treatment (printed portion) (fmol/m$^2$/s/Pa) | A | A | A | A |
| Oxygen permeability after hydrothermal treatment (non-printed portion) (fmol/m$^2$/s/Pa) | A | B | B | A |
| Oxygen permeability after hydrothermal treatment (printed portion) (fmol/m$^2$/s/Pa) | C | B | B | A |
| Adhesion property after hydrothermal treatment | A | A | A | A |
| Gradation printability | A | C | A | A |

TABLE 9

|  | Examples | | | |
| --- | --- | --- | --- | --- |
|  | 30 | 31 | 32 | 33 |
| Construction of gas-barrier laminate | | | | |
| Substrate | PET | ONY | PET | PET |
| Inorganic thin film | SiOx | SiOx | SiOx | SiOx |
| Coating layer (kind of resin; molecular weight) | UT[5] (15000) PE[6] (15000) | UT[5] (15000) PE[6] (15000) | AR[8] (40%):UT[5] (40%):OZ[9] (20%) | AR[8] (40%):UT[5] (40%):OZ[9] (20%) |
| Thickness of coating layer (μm) | 0.5 | 0.5 | 0.5 | 0.5 |
| Layer structure of laminate | PET/ Al$_2$O$_3$/ PL[7]/PP | PET/ PL[7]// SiOx/ ONY/ PP | PET/ SiOx/ PL[7]/PP | PET/ SiOx/ PL[7]/ONY/ PP |
| Use or non-use of heat treatment | None | None | None | 150° C. 30 min |
| Properties of gas-barrier laminate | | | | |
| Hardness of coating layer in air (GPa) | 0.21 | 0.21 | 0.23 | 0.23 |
| Hardness of coating layer in water (GPa) | 0.16 | 0.16 | 0.12 | 0.12 |
| Ratio of number of carbon atoms derived from carboxyl groups to number of carbon atoms constituting surface of coating layer | 0.01 | 0.01 | 0.012 | 0.012 |
| Oxygen permeability before hydrothermal treatment (printed portion) (fmol/m$^2$/s/Pa) | B | A | A | A |

TABLE 9-continued

|  | Examples | | | |
|---|---|---|---|---|
|  | 30 | 31 | 32 | 33 |
| Oxygen permeability after hydrothermal treatment (non-printed portion) (fmol/m$^2$/s/Pa) | B | A | B | A |
| Oxygen permeability after hydrothermal treatment (printed portion) (fmol/m$^2$/s/Pa) | B | B | B | A |
| Adhesion property after hydrothermal treatment | A | A | B | A |
| Gradation printability | A | A | A | A |

Note:
[8)] AR: Acryl;
[9)] OZ: Oxazoline

TABLE 10

|  | Ex. | Reference Examples | | |
|---|---|---|---|---|
|  | 34 | 12 | 13 | 14 |
| *Construction of gas-barrier laminate* | | | | |
| Substrate | PET | PET | PET | PET |
| Inorganic thin film | SiOx | SiOx | SiOx | SiOx |
| Coating layer (kind of resin; molecular weight) | AS-PUT[10)] | UT[5)] (15000) PE[6)] (8000) S[11)] (20%) | AR[8)] (40%):UT[5)] (40%):OZ[9)] (20%):SS[12)] (50 wt %) | PE[6)] (3000) |
| Thickness of coating layer (μm) | 0.5 | 0.5 | 0.5 | 0.5 |
| Layer structure of laminate | PET/SiOx/PL[7)]/PP | PET/SiOx/PL[7)]/PP | PET/SiOx/PL[7)]/PP | PET/SiOx/PL[7)]/PP |
| Use or non-use of heat treatment | None | None | None | None |
| *Properties of gas-barrier laminate* | | | | |
| Hardness of coating layer in air (GPa) | 0.42 | 0.55 | 0.65 | 0.53 |
| Hardness of coating layer in water (GPa) | 0.35 | 0.51 | 0.53 | 0.5 |
| Ratio of number of carbon atoms derived from carboxyl groups to number of carbon atoms constituting surface of coating layer | 0.01 | 0.005 | 0.004 | 0.005 |
| Oxygen permeability before hydrothermal treatment (printed portion) (fmol/m$^2$/s/Pa) | A | A | A | A |
| Oxygen permeability after hydrothermal treatment (non-printed portion) (fmol/m$^2$/s/Pa) | B | D | D | D |
| Oxygen permeability after hydrothermal treatment (printed portion) (fmol/m$^2$/s/Pa) | B | D | D | D |
| Adhesion property after hydrothermal treatment | A | B | B | D |
| Gradation printability | B | C | B | C |

Note:
[10)] AS-PUT: Alkoxysilyl group-containing polyurethane;
[11)] S: Silica;
[12)] SS: Silica sol

TABLE 11

|  | Reference Examples | | |
|---|---|---|---|
|  | 15 | 16 | 17 |
| *Construction of gas-barrier laminate* | | | |
| Substrate | PET | PET | PET |
| Inorganic thin film | SiOx | SiOx | SiOx |
| Coating layer (kind of resin; molecular weight) | UT[5)] (15000) | UT[5)] (85 wt %):PE[6)] (15 wt %) | None |
| Thickness of coating layer (μm) | 0.5 | 0.5 | — |
| Layer structure of laminate | PET/SiOx/PL[7)]/PP | PET/SiOx/PL[7)]/PP | PET/SiOx/PL[7)]/PP |
| Use or non-use of heat treatment | None | None | None |
| *Properties of gas-barrier laminate* | | | |
| Hardness of coating layer in air (GPa) | 0.2 | 0.43 | — |
| Hardness of coating layer in water (GPa) | 0.18 | 0.25 | — |
| Ratio of number of carbon atoms derived from carboxyl groups to number of carbon atoms constituting surface of coating layer | 0.003 | 0.002 | — |
| Oxygen permeability before hydrothermal treatment (printed portion) (fmol/m$^2$/s/Pa) | A | A | D |
| Oxygen permeability after hydrothermal treatment (non-printed portion) (fmol/m$^2$/s/Pa) | D | D | D |
| Oxygen permeability after hydrothermal treatment (printed portion) (fmol/m$^2$/s/Pa) | D | D | D |
| Adhesion property after hydrothermal treatment | C | D | D |
| Gradation printability | D | B | B |

While the present invention has been described above with reference to the specific examples which are considered to be most practical and preferred at the present time, it should be noted that these examples are only illustrative and not intended to limit the scope of the present invention, and many modifications and variations are possible without departing from the scope and sprit of the present invention. Meanwhile, the present patent application is based on Japanese Patent Application No. 2004-90039 filed on Mar. 25, 2004 and Japanese Patent Application No. 2004-253341 filed on Aug. 31, 2004 which are incorporated herein as a whole by reference.

The invention claimed is:

1. A gas-barrier laminate, comprising:
   a plastic substrate;
   an inorganic thin film formed on at least one surface of the plastic substrate; and
   a coating layer on a surface of the inorganic thin film;
   wherein
   the coating layer comprises:
   a polyester resin having a molecular weight of 3000 to 15000, and
   a polyurethane resin having a molecular weight of 8000 to 3000,
   a weight ratio of the polyester resin to the polyurethane resin is from 5/95 to 95/5, and
   an oxygen permeability of the gas-barrier laminate is not more than 25 fmol/m²/s/Pa.

2. The gas-barrier laminate according to claim 1, wherein the polyester-based resin and the polyurethane-based resin respectively have a glass transition temperature of 55 to 100° C. and an acid value of 1 to 100 mg KOH/g.

3. The gas-barrier laminate according to claim 1, wherein the coating layer contains a silane coupling agent in an amount of 0.1 to 20% by weight.

4. The gas-barrier laminate according to claim 3, wherein the silane coupling agent is an epoxy group-containing silane coupling agent, an amino group-containing silane coupling agent or a mixture thereof.

5. The gas-barrier laminate according to claim 1, wherein the coating material contains a fatty acid, a fatty ester, a fatty amide or a mixture thereof in an amount of 0.05 to 20 parts by weight based on 100 parts by weight of a sum of the polyester-based resin and the polyurethane-based resin.

6. The gas-barrier laminate according to claim 1, wherein the coating material contains a polyisocyanate as a curing agent and a content of the polyisocyanate in the coating material is 0.8 to 1.5 times a total hydroxyl equivalent of the polyester-based resin and the polyurethane-based resin.

7. The gas-barrier laminate according to claim 6, wherein the polyisocyanate contains at least one compound having three or more active isocyanate groups in a molecule thereof.

8. The gas-barrier laminate according to claim 1, wherein the plastic substrate comprises a polyester resin, a polyamide resin, a polyolefin resin, an ethylene-vinyl alcohol copolymer resin or a biodegradable resin.

9. The gas-barrier laminate according to claim 1, wherein the inorganic thin film is a physically vapor-deposited film or a chemically vapor-deposited film comprising silicon oxide, aluminum oxide, diamond-like carbon or a mixture thereof.

10. The gas-barrier laminate according to claim 1, further comprising an anchor coat layer disposed between the plastic substrate and the inorganic thin film.

11. The gas-barrier laminate according to claim 10, wherein the anchor coat layer comprises at least one resin selected from the group consisting of a polyester resin, an urethane resin, an acrylic resin, an alkoxysilyl group-containing resin, an oxazoline group-containing resin and copolymer resins thereof.

12. The gas-barrier laminate according to claim 1, further comprising a printed layer on a surface of the coating layer, and a heat seal layer on a surface of the printed layer.

13. The gas-barrier laminate according to claim 12, further comprising at least one paper or plastic substrate disposed between the printed layer and the heat seal layer.

14. The gas-barrier laminate according to claim 13, wherein the plastic substrate between the printed layer and the heat seal layer comprises a polyester-based resin, a polyamide-based resin, an ethylene-vinyl acetate copolymer resin or a mixture thereof.

15. The gas-barrier laminate according to claim 12, wherein when the gas-barrier laminate is subjected to hydrothermal treatment under pressure at 120° C. for 30 min, an adhesion strength between the inorganic thin film and the coating layer is not less than 100 g/15 mm, and an adhesion strength between the coating layer and the printed layer is not less than 100 g/15 mm.

16. The gas-barrier laminate according to claim 1, wherein the gas-barrier laminate is heat-treated at a temperature of not less than 60° C.

17. The gas-barrier laminate according to claim 1, wherein when the gas-barrier laminate is subjected to hydrothermal treatment under pressure at 120° C. for 30 min, an oxygen permeability of the gas-barrier laminate after being subjected to the hydrothermal treatment is not more than 25 fmol/m²/s/Pa.

18. The gas-barrier laminate according to claim 1, wherein when the gas-barrier laminate is further laminated on coating layer with an unstretched polypropylene film having a thickness of 60 μm and the further obtained laminate subjected to a hydrothermal treatment at 120° C. for 30 min, an oxygen permeability of further laminate is not more than 50 fmol/m²/s/Pa.

19. The gas-barrier laminate according to claim 18, wherein a hardness of the coating layer is from 0.1 to 0.5 GPa as measured at 23° C. in atmospheric air by a nano-indentation hardness testing method.

20. The gas-barrier laminate according to claim 18, wherein a hardness of the coating layer is from 0.03 to 0.5 GPa as measured at 23° C. in water by a nano-indentation hardness testing method.

21. The gas-barrier laminate according to claim 18, wherein a ratio of number of carbon atoms derived from carboxyl groups to number of carbon atoms constituting the surface of the coating layer is from 0.005 to 0.1.

* * * * *